United States Patent
Kim et al.

(10) Patent No.: US 10,484,142 B2
(45) Date of Patent: Nov. 19, 2019

(54) METHOD FOR TRANSMITTING HARQ ACK/NACK FEEDBACK BY USING TERMINAL-SPECIFIC TDD FRAME IN WIRELESS COMMUNICATION SYSTEM, AND DEVICE THEREFOR

(71) Applicant: LG ELECTRONICS INC., Seoul (KR)

(72) Inventors: Dongkyu Kim, Seoul (KR); Kwangseok Noh, Seoul (KR); Hyunsoo Ko, Seoul (KR); Kukheon Choi, Seoul (KR); Sangrim Lee, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 15/748,426

(22) PCT Filed: Jul. 7, 2016

(86) PCT No.: PCT/KR2016/007388
§ 371 (c)(1),
(2) Date: Jan. 29, 2018

(87) PCT Pub. No.: WO2017/022960
PCT Pub. Date: Feb. 9, 2017

(65) Prior Publication Data
US 2018/0219648 A1    Aug. 2, 2018

Related U.S. Application Data

(60) Provisional application No. 62/199,316, filed on Jul. 31, 2015.

(51) Int. Cl.
*H04L 1/18*    (2006.01)
*H04L 5/14*    (2006.01)
(Continued)

(52) U.S. Cl.
CPC .......... *H04L 1/1812* (2013.01); *H04L 1/1854* (2013.01); *H04L 5/0055* (2013.01);
(Continued)

(58) Field of Classification Search
CPC . H04L 1/1812; H04L 1/18; H04L 1/16; H04L 1/12; H04L 1/1854; H04L 1/1829;
(Continued)

(56) References Cited

U.S. PATENT DOCUMENTS

2013/0343241 A1    12/2013  Niu et al.
2014/0071952 A1*    3/2014  Kim ................. H04L 5/001
                                            370/335
(Continued)

FOREIGN PATENT DOCUMENTS

WO    2013/100475 A1    7/2013
WO    2013/191419 A1    12/2013
(Continued)

OTHER PUBLICATIONS

3GPP TS 36.213 V12.5.0 (Mar. 2015)Technical Specification Group Radio Access Network; Evolved Universal Terrestrial Radio Access (E-UTRA); Physical layer procedures (Year: 2015).*
(Continued)

*Primary Examiner* — Jeffrey M Rutkowski
*Assistant Examiner* — Luna Weissberger
(74) *Attorney, Agent, or Firm* — Dentons US LLP

(57) ABSTRACT

A method for a terminal transmitting a hybrid automatic repeat request (HARQ) ACK/NACK feedback by using a terminal-specific TDD frame in a wireless communication system may comprise the steps of: receiving a downlink control channel from a corresponding subframe of the terminal-specific TDD frame; and transmitting a HARQ ACK/NACK for the downlink control channel from an uplink subframe that is the most adjacent to the corresponding subframe among subframes coming after at least four subframes from the corresponding subframe.

12 Claims, 14 Drawing Sheets

(51) Int. Cl.
*H04W 72/04* (2009.01)
*H04L 5/00* (2006.01)
*H04L 25/02* (2006.01)

(52) U.S. Cl.
CPC ........... *H04L 5/14* (2013.01); *H04W 72/0413* (2013.01); *H04W 72/0446* (2013.01); *H04L 25/0202* (2013.01)

(58) Field of Classification Search
CPC ..... H04L 5/0055; H04L 5/0053; H04L 5/003; H04L 5/00; H04L 5/14; H04L 25/0202; H04L 25/02; H04W 72/0446; H04W 72/044; H04W 72/04; H04W 72/0413; H04W 72/0406
USPC ........................................................ 370/329
See application file for complete search history.

(56) References Cited

U.S. PATENT DOCUMENTS

| | | |
|---|---|---|
| 2014/0086112 A1 | 3/2014 | Stern-Berkowitz et al. |
| 2014/0092793 A1 | 4/2014 | Yang et al. |
| 2014/0153453 A1 | 6/2014 | Park et al. |
| 2014/0204783 A1 | 7/2014 | Lin et al. |
| 2014/0204807 A1 | 7/2014 | Li et al. |
| 2014/0241223 A1 | 8/2014 | Takeda et al. |
| 2014/0293843 A1 | 10/2014 | Papasakellariou et al. |
| 2014/0301255 A1 | 10/2014 | Yin et al. |
| 2014/0334355 A1 | 11/2014 | Ekpenyong et al. |
| 2015/0162979 A1 | 6/2015 | Yuk et al. |
| 2015/0181588 A1* | 6/2015 | Song ..................... H04L 1/1607 370/280 |
| 2015/0244485 A1* | 8/2015 | Nguyen ............ H04W 72/0446 370/280 |

FOREIGN PATENT DOCUMENTS

| | | |
|---|---|---|
| WO | 2013/191420 A1 | 12/2013 |
| WO | 2014/092365 A1 | 6/2014 |
| WO | 2014/192453 A1 | 12/2014 |
| WO | 2015/006905 A1 | 1/2015 |
| WO | 2015/044513 A1 | 4/2015 |
| WO | 2015/105208 A1 | 7/2015 |

OTHER PUBLICATIONS

3GPP TS 36.213 V11.7.0, "Physical layer procedures (Release 11)", XP050774080, Jun. 19, 2014, pp. 1-182.

* cited by examiner

FIG. 12

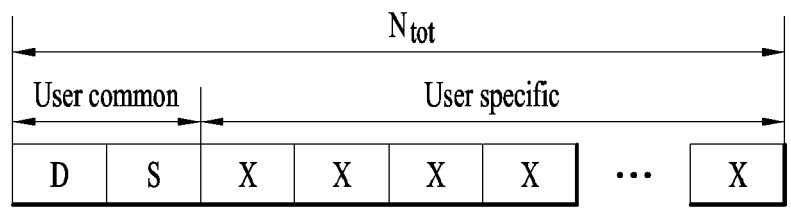

$N_{tot}$ : Total number of subframe in a radio frame

D : Downlink subframe

U : Uplink subframe

S : Special subframe, i.e., downlink symbols + guard time + uplink symbols

X : User specifically configured subframe (downlink or uplink or special subframe)

FIG. 13

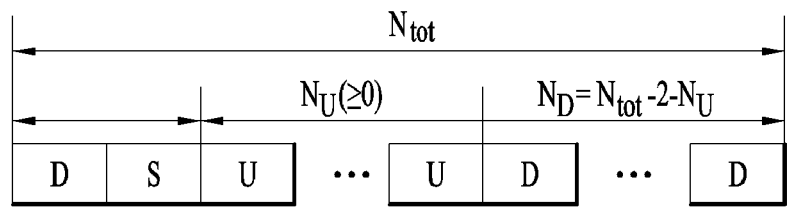

$N_{tot}$ : Total number of subframe in a radio frame $N_D$ : Number of downlink subframe in user specifically configured subframe $N_U$ : Number of uplink subframe in user specifically configured subframe

FIG. 14

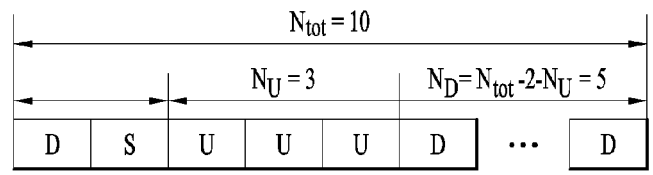

$N_{tot}$ : Total number of subframe in a radio frame
$N_D$ : Number of downlink subframe in user specifically configured subframe
$N_U$ : Number of uplink subframe in user specifically configured subframe

FIG. 15

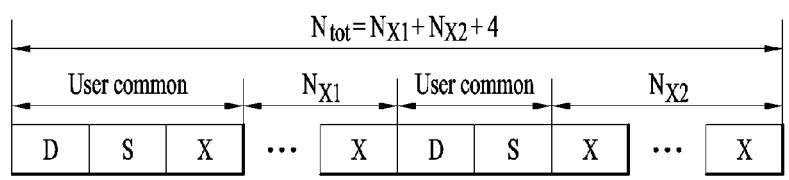

$N_{tot}$ : Total number of subframe in a radio frame
$N_{X1}$ : Number of the first consecutive flexible subframe
$N_{X2}$ : Number of the second consecutive flexible subframe

FIG. 16

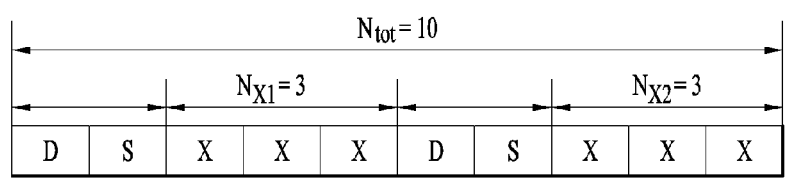

$N_{tot}$ : Total number of subframe in a radio frame
$N_{X1}$ : Number of the first consecutive flexible subframe
$N_{X2}$ : Number of the second consecutive flexible subframe

FIG. 17

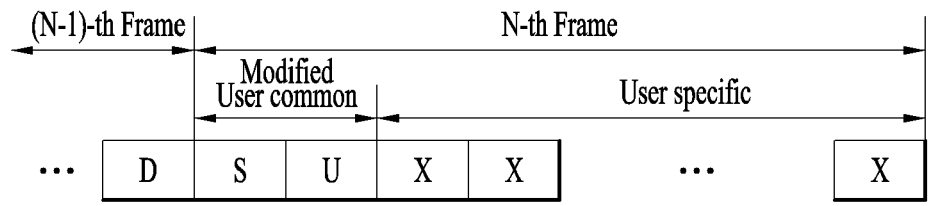

$N_{tot}$ : Total number of subframe in a radio frame

D : Downlink subframe

U : Uplink subframe

S : Special subframe, i.e., downlink symbols + guard time + uplink symbols

X : User specifically configured subframe (downlink or uplink or special subframe)

FIG. 18

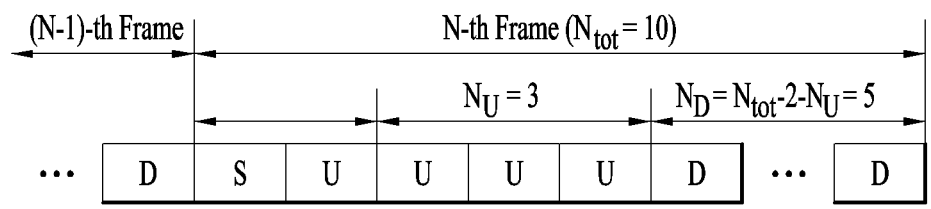

$N_{tot}$ : Total number of subframe in a radio frame $N_D$ : Number of downlink subframe in user specifically configured subframe $N_U$ : Number of uplink subframe in user specifically configured subframe $N_{tot}$ : Total number of subframe in a radio frame D : Downlink subframe U : Uplink subframe S : Special subframe, i.e., downlink symbols + guard time + uplink symbols X : User specifically configured subframe (downlink or uplink or special subframe)

METHOD FOR TRANSMITTING HARQ ACK/NACK FEEDBACK BY USING TERMINAL-SPECIFIC TDD FRAME IN WIRELESS COMMUNICATION SYSTEM, AND DEVICE THEREFOR

This application is a 35 USC § 371 National Stage entry of International Application No. PCT/KR2016/007388, filed on Jul. 7, 2016, and claims priority to U.S. Provisional Application No. 62/199,316, filed on Jul. 31, 2015, all of which are incorporated by reference in their entirety herein.

TECHNICAL FIELD

The present invention relates to wireless communication, and more particularly to a method and apparatus for transmitting a hybrid automatic repeat request (HARQ) ACK/NACK feedback using a UE-specific Time Division Duplex (TDD) frame in a wireless communication system.

BACKGROUND ART

Compared to conventional half duplex communication in which time or frequency resources are divided orthogonally, full duplex communication doubles a system capacity in theory by allowing a node to perform transmission and reception simultaneously.

FIG. 1 is a conceptual view of a UE and a Base Station (BS) which support Full Duplex Radio (FDR).

In the FDR situation illustrated in FIG. 1, the following three types of interference are produced.

Intra-device self-interference: Because transmission and reception take place in the same time and frequency resources, a desired signal and a signal transmitted from a BS or UE are received at the same time at the BS or UE. The transmitted signal is received with almost no attenuation at a Reception (Rx) antenna of the BS or UE, and thus with much larger power than the desired signal. As a result, the transmitted signal serves as interference.

UE to UE inter-link interference: An Uplink (UL) signal transmitted by a UE is received at an adjacent UE and thus serves as interference.

BS to BS inter-link interference: The BS to BS inter-link interference refers to interference caused by signals that are transmitted between BSs or heterogeneous BSs (pico, femto, and relay) in a HetNet state and received by an Rx antenna of another BS.

DISCLOSURE

Technical Problem

The present invention is devised to solve the above problems, and one technical task of the present invention is to provide a method for transmitting HARQ ACK/NACK using a UE-specific TDD frame by a user equipment (UE) in a wireless communication system.

Another technical task of the present invention is to provide a user equipment (UE) for transmitting HARQ ACK/NACK feedback using a UE-specific TDD frame in a wireless communication system.

Technical tasks obtainable from the present invention are non-limited by the above-mentioned technical task, and other unmentioned technical tasks can be clearly understood from the following description by those having ordinary skill in the technical field to which the present invention pertains.

Technical Solutions

To achieve one object of the present invention, a method for transmitting a hybrid automatic repeat request (HARQ) ACK/NACK feedback using a UE-specific TDD frame by a user equipment (UE) in a wireless communication system, the method comprises receiving a downlink (DL) control channel in a corresponding subframe of the UE-specific TDD frame; and transmitting the HARQ ACK/NACK for the DL control channel in an uplink (UL) subframe located closest to the corresponding subframe from among subframes located after at least four subframes from the corresponding subframe. The UE-specific TDD frame includes a UE-common subframe interval and a UE-specific subframe interval. The UE-common subframe interval corresponds to a subframe interval that is commonly configured in UEs of the wireless communication system or UEs of a cell including the UEs a first frame and a second subframe in the UE-specific TDD frame are configured as the UE-common subframe interval. The first subframe is a special subframe, and the second subframe is an uplink (UL) subframe. The UE-specific TDD frame includes a plurality of UE-common subframe intervals.

To achieve another object of the present invention, the object of the present invention can be achieved by providing a user equipment (UE) for transmitting a hybrid automatic repeat request (HARQ) ACK/NACK feedback using a UE-specific TDD frame in a wireless communication system. A user equipment (UE) for transmitting a hybrid automatic repeat request (HARQ) ACK/NACK feedback using a UE-specific TDD frame in a wireless communication system comprises a receiver; a transmitter; and a processor, wherein the processor controls the receiver to receive a downlink (DL) control channel in a corresponding subframe of the UE-specific TDD frame, and controls the transmitter to transmit the HARQ ACK/NACK for the DL control channel in an uplink (UL) subframe located closest to the corresponding subframe from among subframes located after at least four subframes from the corresponding subframe. The UE-specific TDD frame includes a UE-common subframe interval and a UE-specific subframe interval. The UE-common subframe interval corresponds to a subframe interval that is commonly configured in UEs of the wireless communication system or UEs of a cell including the UEs. A first frame and a second subframe in the UE-specific TDD frame is configured as the UE-common subframe. The first subframe is a special subframe, and the second subframe is an uplink (UL) subframe.

Advantageous Effects

As is apparent from the above description, the embodiments of the present invention can efficiently use a UE-specific dynamic TDD transmission scheme by transmitting HARQ ACK/NACK feedback to a UE-specific dynamic TDD frame.

Effects obtainable from the present invention are non-limited by the above mentioned effect. And, other unmentioned effects can be clearly understood from the following description by those having ordinary skill in the technical field to which the present invention pertains. Namely, effects unintended in implementing the present invention can be derived from the embodiments of the present invention by those having ordinary skill in the technical field to which the present invention pertains as well.

DESCRIPTION OF DRAWINGS

The accompanying drawings, which are included to provide a further understanding of the invention and are incorporated in and constitute a part of this specification, illustrate embodiments of the invention and together with the description serve to explain the principles of the invention. And, the accompanying drawings are used to describe embodiments of the present invention together with the detailed description.

FIG. 12 is a view illustrating design references of a radio frame resource structure based on a user-specific (or UE-specific) dynamic TDD transmission scheme.

FIG. 13 is a view illustrating references of a radio frame resource structure based on a user-specific dynamic TDD transmission scheme.

FIG. 14 is a view illustrating an example for representing the frame structure of FIG. 13 as a user-specific dynamic TDD radio frame structure matched with a 3GPP LTE radio frame structure.

FIG. 15 is a view illustrating an example of a radio frame structure based on a UE-specific dynamic TDD transmission scheme having two user-common subframe intervals.

FIG. 16 is a view illustrating an example of a frame structure based on a UE-specific dynamic TDD transmission scheme having two user-common subframe intervals matched with a 3GPP LTE radio frame structure.

FIG. 17 is a view illustrating an example of a modified radio frame resource structure based on a user-specific dynamic TDD transmission scheme.

FIG. 18 is a view illustrating an example for representing the frame structure of FIG. 17 as a user-specific dynamic TDD frame structure matched with a 3GPP LTE/LTE-A radio frame structure.

BEST MODE

Figure 1:
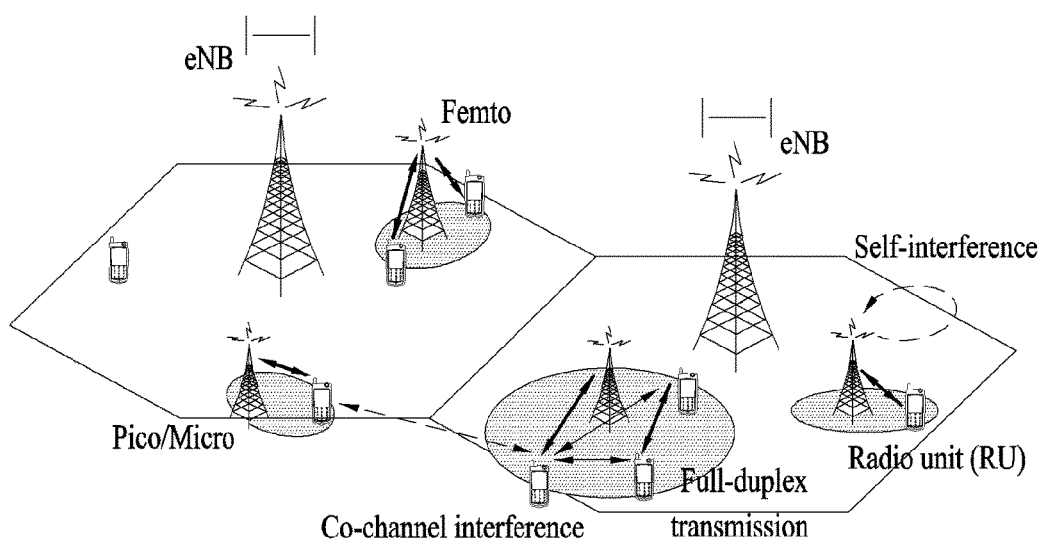
FIG. 1 is a conceptual view of a UE and a Base Station (BS) which support Full Duplex Radio (FUR).

Reference will now be made in detail to the preferred embodiments of the present invention, examples of which are illustrated in the accompanying drawings. In the following detailed description of the invention includes details to help the full understanding of the present invention. Yet, it is apparent to those skilled in the art that the present invention can be implemented without these details. For instance, although the following descriptions are made in detail on the assumption that a mobile communication system includes 3GPP LTE system, the following descriptions are applicable to other random mobile communication systems in a manner of excluding unique features of the 3GPP LTE.

Occasionally, to prevent the present invention from getting vaguer, structures and/or devices known to the public are skipped or can be represented as block diagrams centering on the core functions of the structures and/or devices. Wherever possible, the same reference numbers will be used throughout the drawings to refer to the same or like parts.

Besides, in the following description, assume that a terminal is a common name of such a mobile or fixed user stage device as a user equipment (UE), a mobile station (MS), an advanced mobile station (AMS) and the like. And, assume that a base station (BS) is a common name of such a random node of a network stage communicating with a terminal as a Node B (NB), an eNode B (eNB), an access point (AP) and the like. Although the present specification is described based on IEEE 802.16m system, contents of the present invention may be applicable to various kinds of other communication systems.

In a mobile communication system, a user equipment is able to receive information in downlink and is able to transmit information in uplink as well. Information transmitted or received by the user equipment node may include various kinds of data and control information. In accordance with types and usages of the information transmitted or received by the user equipment, various physical channels may exist.

The following descriptions are usable for various wireless access systems including CDMA (code division multiple access), FDMA (frequency division multiple access), TDMA (time division multiple access), OFDMA (orthogonal frequency division multiple access), SC-FDMA (single carrier frequency division multiple access) and the like. CDMA can be implemented by such a radio technology as UTRA (universal terrestrial radio access), CDMA 2000 and the like. TDMA can be implemented with such a radio technology as GSM/GPRS/EDGE (Global System for Mobile communications)/General Packet Radio Service/Enhanced Data Rates for GSM Evolution). OFDMA can be implemented with such a radio technology as IEEE 802.11 (Wi-Fi), IEEE 802.16 (WiMAX), IEEE 802.20, E-UTRA (Evolved UTRA), etc. UTRA is a part of UMTS (Universal Mobile Telecommunications System). 3GPP (3rd Generation Partnership Project) LTE (long term evolution) is a part of E-UMTS (Evolved UMTS) that uses E-UTRA. The 3GPP LTE employs OFDMA in DL and SC-FDMA in UL. And, LTE-A (LTE-Advanced) is an evolved version of 3GPP LTE.

Moreover, in the following description, specific terminologies are provided to help the understanding of the present invention. And, the use of the specific terminology can be modified into another form within the scope of the technical idea of the present invention.

Figure 2:
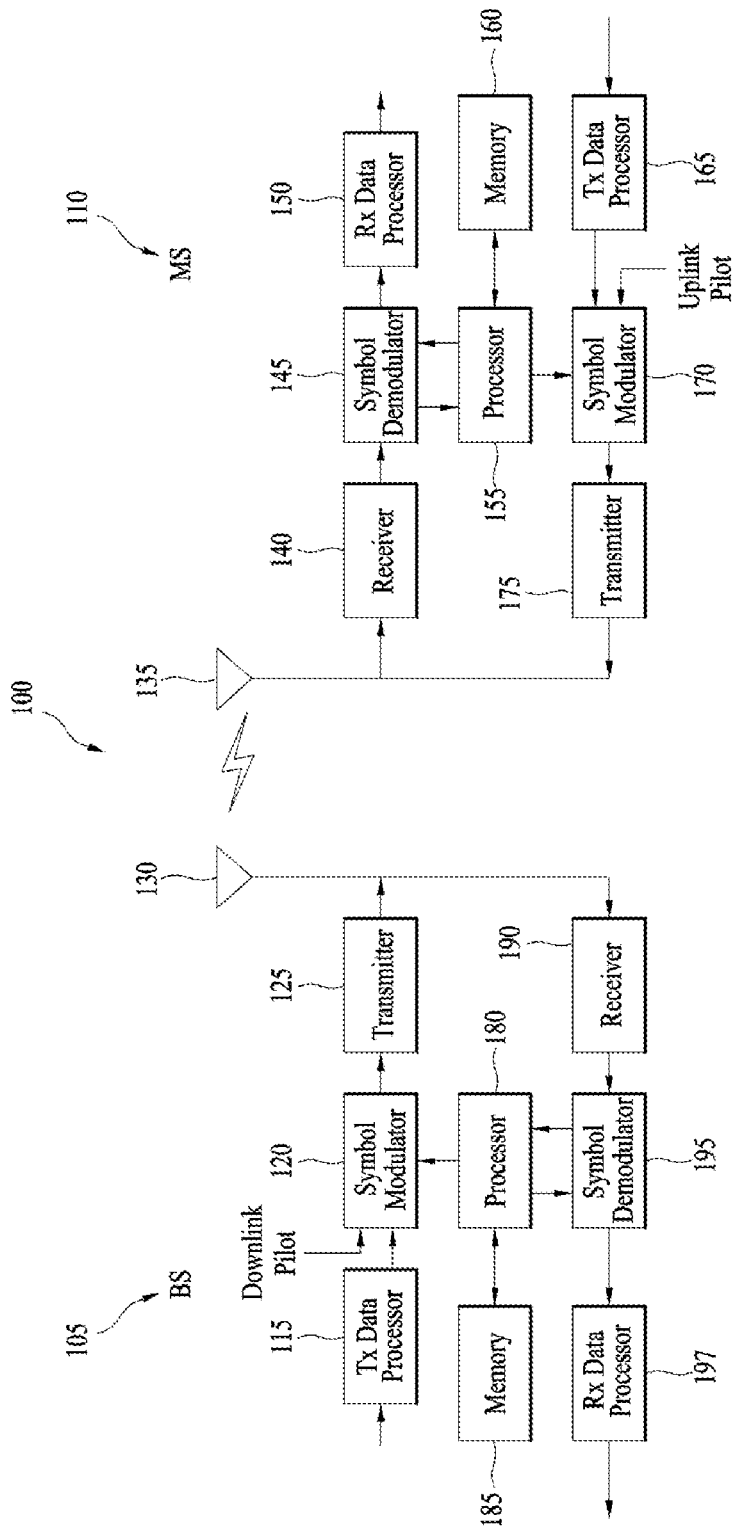
FIG. 2 is a block diagram for configurations of a base station 105 and a user equipment (UE) 110 in a wireless communication system 100.

FIG. 2 is a block diagram for configurations of a base station 105 and a user equipment 110 in a wireless communication system 100.

Although one base station 105 and one user equipment 110 (D2D user equipment included) are shown in the drawing to schematically represent a wireless communication system 100, the wireless communication system 100 may include at least one base station and/or at least one user equipment.

Referring to FIG. 2, a base station 105 may include a transmitted (Tx) data processor 115, a symbol modulator 120, a transmitter 125, a transceiving antenna 130, a processor 180, a memory 185, a receiver 190, a symbol demodulator 195 and a received data processor 197. And, a user equipment 110 may include a transmitted (Tx) data processor 165, a symbol modulator 170, a transmitter 175, a transceiving antenna 135, a processor 155, a memory 160, a receiver 140, a symbol demodulator 155 and a received data processor 150. Although the base station/user equipment 105/110 includes one antenna 130/135 in the drawing, each of the base station 105 and the user equipment 110 includes a plurality of antennas. Therefore, each of the base station 105 and the user equipment 110 of the present invention supports an MIMO (multiple input multiple output) system. And, the base station 105 according to the present invention may support both SU-MIMO (single user-MIMO) and MU-MIMO (multi user-MIMO) systems.

In downlink, the transmitted data processor 115 receives traffic data, codes the received traffic data by formatting the received traffic data, interleaves the coded traffic data, modulates (or symbol maps) the interleaved data, and then provides modulated symbols (data symbols). The symbol modulator 120 provides a stream of symbols by receiving and processing the data symbols and pilot symbols.

The symbol modulator 120 multiplexes the data and pilot symbols together and then transmits the multiplexed symbols to the transmitter 125. In doing so, each of the transmitted symbols may include the data symbol, the pilot symbol or a signal value of zero. In each symbol duration, pilot symbols may be contiguously transmitted. In doing so, the pilot symbols may include symbols of frequency division multiplexing (FDM), orthogonal frequency division multiplexing (OFDM), or code division multiplexing (CDM).

The transmitter 125 receives the stream of the symbols, converts the received stream to at least one or more analog signals, additionally adjusts the analog signals (e.g., amplification, filtering, frequency upconverting), and then generates a downlink signal suitable for a transmission on a radio channel Subsequently, the downlink signal is transmitted to the user equipment via the antenna 130.

In the configuration of the user equipment 110, the receiving antenna 135 receives the downlink signal from the base station and then provides the received signal to the receiver 140. The receiver 140 adjusts the received signal (e.g., filtering, amplification and frequency downconverting), digitizes the adjusted signal, and then obtains samples. The symbol demodulator 145 demodulates the received pilot symbols and then provides them to the processor 155 for channel estimation.

The symbol demodulator 145 receives a frequency response estimated value for downlink from the processor 155, performs data demodulation on the received data symbols, obtains data symbol estimated values (i.e., estimated values of the transmitted data symbols), and then provides the data symbols estimated values to the received (Rx) data processor 150. The received data processor 150 reconstructs the transmitted traffic data by performing demodulation (i.e., symbol demapping, deinterleaving and decoding) on the data symbol estimated values.

The processing by the symbol demodulator 145 and the processing by the received data processor 150 are complementary to the processing by the symbol modulator 120 and the processing by the transmitted data processor 115 in the base station 105, respectively.

In the user equipment 110 in uplink, the transmitted data processor 165 processes the traffic data and then provides data symbols. The symbol modulator 170 receives the data symbols, multiplexes the received data symbols, performs modulation on the multiplexed symbols, and then provides a stream of the symbols to the transmitter 175. The transmitter 175 receives the stream of the symbols, processes the received stream, and generates an uplink signal. This uplink signal is then transmitted to the base station 105 via the antenna 135.

In the base station 105, the uplink signal is received from the user equipment 110 via the antenna 130. The receiver 190 processes the received uplink signal and then obtains samples. Subsequently, the symbol demodulator 195 processes the samples and then provides pilot symbols received in uplink and a data symbol estimated value. The received data processor 197 processes the data symbol estimated value and then reconstructs the traffic data transmitted from the user equipment 110.

The processor 155/180 of the user equipment/base station 110/105 directs operations (e.g., control, adjustment, management, etc.) of the user equipment/base station 110/105. The processor 155/180 may be connected to the memory unit 160/185 configured to store program codes and data. The memory 160/185 is connected to the processor 155/180 to store operating systems, applications and general files.

The processor 155/180 may be called one of a controller, a microcontroller, a microprocessor, a microcomputer and the like. And, the processor 155/180 may be implemented using hardware, firmware, software and/or any combinations thereof. In the implementation by hardware, the processor 155/180 may be provided with such a device configured to implement the present invention as ASICs (application specific integrated circuits), DSPs (digital signal processors), DSPDs (digital signal processing devices), PLDs (programmable logic devices), FPGAs (field programmable gate arrays), and the like.

Meanwhile, in case of implementing the embodiments of the present invention using firmware or software, the firmware or software may be configured to include modules, procedures, and/or functions for performing the above-explained functions or operations of the present invention. And, the firmware or software configured to implement the present invention is loaded in the processor 155/180 or saved in the memory 160/185 to be driven by the processor 155/180.

Layers of a radio protocol between a user equipment/base station and a wireless communication system (network) may be classified into 1st layer L1, 2nd layer L2 and 3rd layer L3 based on 3 lower layers of OSI (open system interconnection) model well known to communication systems. A physical layer belongs to the 1st layer and provides an information transfer service via a physical channel. RRC (radio resource control) layer belongs to the 3rd layer and provides control radio resourced between UE and network. A user equipment and a base station may be able to exchange RRC messages with each other through a wireless communication network and RRC layers.

In the present specification, although the processor 155/180 of the user equipment/base station performs an operation of processing signals and data except a function for the user equipment/base station 110/105 to receive or transmit a signal, for clarity, the processors 155 and 180 will not be mentioned in the following description specifically. In the following description, the processor 155/180 can be regarded as performing a series of operations such as a data processing and the like except a function of receiving or transmitting a signal without being specially mentioned.

Figure 3:
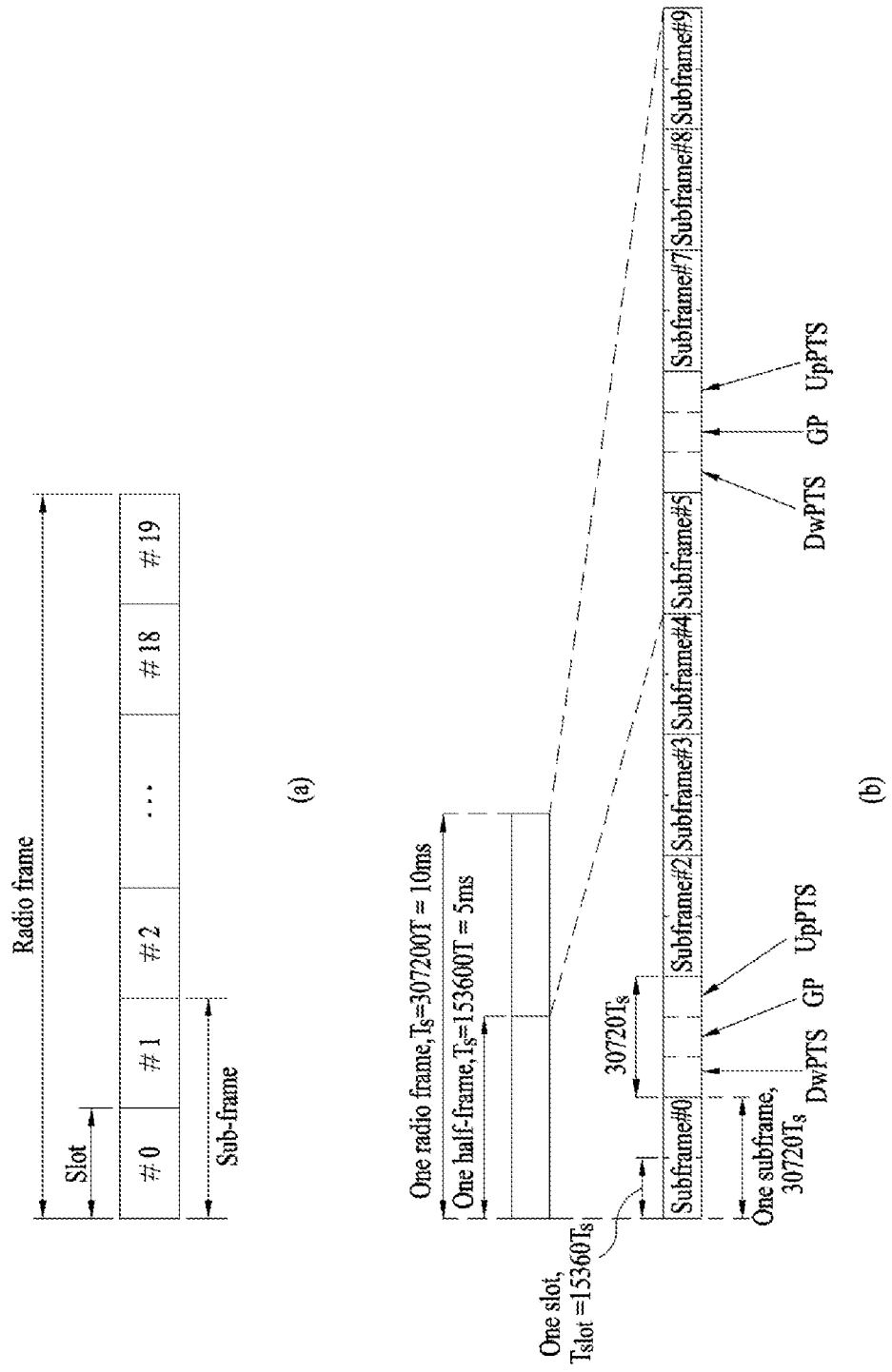
FIG. 3 is a diagram showing the structure of a radio frame used in a 3GPP LTE/LTE-A system which is an example of a wireless communication system.

FIG. 3 is a diagram showing the structure of a radio frame used in a 3GPP LTE/LTE-A system which is an example of a wireless communication system.

As a general wireless transmission method, for wireless transmission between a base station and a wireless user equipment (UE) as wireless devices, transmission from the base station to the wireless UE is referred to as downlink transmission and transmission from the wireless UE to the base station is referred to as uplink transmission. A scheme for dividing radio resources between downlink transmission and uplink transmission is defined as "duplex". Bidirectional transmission and reception in a state of dividing a frequency band into a downlink transmission band and an uplink transmission band is referred to as frequency division duplex (FDD) and transmission and reception in a state of dividing a time-domain radio resources into downlink time duration resources and uplink time duration resources in the same frequency band is referred to as time division duplex (TDD).

In a cellular OFDM wireless packet communication system, an uplink (UL)/downlink (DL) data packet is transmitted on a subframe-by-subframe basis, and one subframe is defined as a predetermined time interval including a plurality of OFDM symbols. 3GPP LTE supports a type-1 radio frame structure applicable to frequency division duplex (FDD) and a type-2 radio frame structure applicable to time division duplex (TDD).

FIG. 3(a) illustrates the type-1 radio frame structure. A downlink radio frame is divided into ten subframes. Each subframe includes two slots in the time domain. The time required to transmit one subframe is defined as a transmission time interval (TTI). For example, a subframe may have a duration of 1 ms and one slot may have a duration of 0.5 ms. A slot may include a plurality of OFDM symbols in the time domain and a plurality of resource blocks (RBs) in the frequency domain. Since 3GPP LTE employs OFDMA for downlink, an OFDM symbol represents one symbol period. An OFDM symbol may be referred to as an SC-FDMA symbol or a symbol period. A resource block (RB), which is a resource allocation unit, may include a plurality of consecutive subcarriers in a slot.

The number of OFDM symbols included in one slot depends on the configuration of a cyclic prefix (CP). CPs are divided into an extended CP and a normal CP. For a normal CP configuring each OFDM symbol, a slot may include 7 OFDM symbols. For an extended CP configuring each OFDM symbol, the duration of each OFDM symbol is extended and thus the number of OFDM symbols included in a slot is smaller than in the case of the normal CP. For the extended CP, a slot may include, for example, 6 OFDM symbols. When a channel status is unstable as in the case of high speed movement of a UE, the extended CP may be used to reduce inter-symbol interference.

When the normal CP is used, each slot includes 7 OFDM symbols, and thus each subframe includes 14 OFDM symbols. In this case, the first three OFDM symbols of each subframe may be allocated to a physical downlink control channel (PDCCH) and the other OFDM symbols may be allocated to a physical downlink shared channel (PDSCH).

FIG. 3(b) illustrates the type-2 radio frame structure.

The type-2 radio frame includes two half frames, each of which has 5 subframes, a downlink pilot time slot (DwPTS), a guard period (GP), and an uplink pilot time slot (UpPTS). Each subframe includes two slots. The DwPTS is used for initial cell search, synchronization, or channel estimation in a UE, whereas the UpPTS is used for channel estimation in a base station and UL transmission synchronization in a UE. The GP is provided to cancel interference generated on UL due to multipath delay of a DL signal between DL and UL.

Each half frame includes 5 subframes, a subframe "D" is a subframe for downlink transmission, a subframe "U" is a subframe for uplink transmission, and a subframe "S" is a special subframe including a DwPTS (Downlink Pilot Time Slot), a guard period (GP) and a UpPTS (Uplink Pilot Time Slot). The DwPTS is used for initial cell search, synchronization, or channel estimation in a UE, whereas the UpPTS is used for channel estimation in a base station and UL transmission synchronization in a UE. The GP is provided to cancel interference generated in UL due to multipath delay of a DL signal between DL and UL.

The special subframe S is present in each half frame in the case of a 5-ms downlink-uplink switch-point period and is present only in a first half frame in the case of a 5-ms downlink-uplink switch-point period. Subframe indices 0 and 5 and DwPTS are used for only downlink transmission. A subframe immediately after the UpPTS and the special subframe is always used for uplink transmission. If multiple cells are aggregated, the UE may assume the same uplink-downlink configuration over all cells and the GPs of the special subframes in different cells overlap by at least 1456 Ts. The radio frame structures are merely examples, and various modifications may be made to the number of subframes included in a radio frame, the number of slots included in a subframe, or the number of symbols included in a slot.

[Table 1] below shows the configuration of the special frames (length of DwPTS/GP/UpPTS).

TABLE 1

| Special subframe configuration | Normal cyclic prefix in downlink | | | Extended cyclic prefix in downlink | | |
| --- | --- | --- | --- | --- | --- | --- |
| | | UpPTS | | | UpPTS | |
| | DwPTS | Normal cyclic prefix in uplink | Extended cyclic prefix in uplink | DwPTS | Normal cyclic prefix in uplink | Extended cyclic prefix in uplink |
| 0 | $6592 \cdot T_s$ | $2192 \cdot T_s$ | $2560 \cdot T_s$ | $7680 \cdot T_s$ | $2192 \cdot T_s$ | $2560 \cdot T_s$ |
| 1 | $19760 \cdot T_s$ | | | $20480 \cdot T_s$ | | |
| 2 | $21952 \cdot T_s$ | | | $23040 \cdot T_s$ | | |
| 3 | $24144 \cdot T_s$ | | | $25600 \cdot T_s$ | | |

TABLE 1-continued

| Special subframe configuration | Normal cyclic prefix in downlink | | | Extended cyclic prefix in downlink | | |
|---|---|---|---|---|---|---|
| | | UpPTS | | | UpPTS | |
| | DwPTS | Normal cyclic prefix in uplink | Extended cyclic prefix in uplink | DwPTS | Normal cyclic prefix in uplink | Extended cyclic prefix in uplink |
| 4 | $26336 \cdot T_s$ | | | $7680 \cdot T_s$ | $4384 \cdot T_s$ | $5120 \cdot T_s$ |
| 5 | $6592 \cdot T_s$ | $4384 \cdot T_s$ | $5120 \cdot T_s$ | $20480 \cdot T_s$ | | |
| 6 | $19760 \cdot T_s$ | | | $23040 \cdot T_s$ | | |
| 7 | $21952 \cdot T_s$ | | | — | — | — |
| 8 | $24144 \cdot T_s$ | | | — | — | — |

[Table 2] below shows an uplink-downlink configuration in type-2 frame structure in a 3GPP LTE system.

TABLE 2

| Uplink-downlink configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

Referring to [Table 2], in the 3GPP LTE system, there are seven uplink-downlink configurations in the type-2 frame structure. The location or number of downlink subframes, special frames or uplink subframes may be changed according to configuration. Various embodiments of the present invention will hereinafter be described centering upon UL-DL configurations of a Type-2 frame structure shown in Table 2. The following Table 3 illustrates k values of TDD configurations 0~6.

TABLE 3

| TDD UL/DL Configuration | subframe number i | | | | | | | | | |
|---|---|---|---|---|---|---|---|---|---|---|
| | 0 | 1 | 2 | 3 | 4 | 5 | 6 | 7 | 8 | 9 |
| 0 | | 7 | 4 | | | | 7 | 4 | | |
| 1 | | 4 | | | 6 | | 4 | | | 6 |
| 2 | | | 6 | | | | | | 6 | 6 |
| 3 | 6 | | | | | | | | 6 | 6 |
| 4 | | | | | | | | | 6 | 6 |
| 5 | | | | | | | | | 6 | |
| 6 | 6 | 4 | | | | | 7 | 4 | | 6 |

HARQ-ACK received over a PHICH allocated to a UE at the subframe (i) in a Type-1 frame structure may be associated with PUSCH transmission at the subframe (i-4). In Type-2 frame structure UL/DL configurations 1~6, HARQ-ACK received over a PHICH allocated to the UE at the subframe (i) may be associated with PUSCH transmission at the subframe i-k (where k is shown in Table 3).

A UE HARQ-ACK procedure for use in the 3GPP LTE/LTE-A system will hereinafter be described. The present invention will be disclosed centering upon the UE HARQ-ACK procedure for use in the 3GPP LTE/LTE-A system.

TABLE 4

For Frame Structure type 2 UL/DL configuration 1-6, an HARQ-ACK received on the PHICH assigned to a UE in subframe i is associated with the PUSCH transmission in the subframe i-k as indicated by the table 3.
For Frame Structure type 2 UL/DL configuration 0, an HARQ-ACK received on the PHICH in the resource corresponding to $I_{PHICH}$ =0, assigned to a UE in subframe i is associated with the PUSCH transmission in the subframe i-k as indicated by the table 3.
If, for Frame Structure type 2 UL/DL configuration 0, an HARQ-ACK received on the PHICH in the resource corresponding to $I_{PHICH}$ =1, assigned to a UE in subframe i is associated with the PUSCH transmission in the subframe i-6.
The physical layer in the UE shall deliver indications to the higher layers as follows:
For downlink subframe i, if a transport block was transmitted in the associated PUSCH subframe then:
- if ACK is decoded on the PHICH corresponding to the transport block in subframe i, ACK for that transport block shall be delivered to the higher layers;
- else NACK for that transport block shall be delivered to the higher layers.
For downlink subframe i, in case of a retransmission in the associated PUSCH subframe, if a transport block was disabled in the associated PUSCH subframe then ACK for that transport block shall be delivered to the higher layers.

The PHICH assignment procedure for use in the 3GPP LTE/LTE-A system will hereinafter be described. The present invention will be disclosed centering upon the PHICH assignment procedure for use in the 3GPP LTE/LTE-A system.

TABLE 5

For PUSCH transmissions scheduled from serving cell in subframe n, a UE shall determine the corresponding PHICH resource of serving cell c in subframe n + $k_{PHICH}$, where $k_{PHICH}$ is always 4 for FDD and is given in following table 6 for TDD. For subframe bundling operation, the corresponding PHICH resource is associated with the last subframe in the bundle.
The PHICH resource is identified by the index pair ($n_{PHICH}^{group}$, $n_{PHICH}^{seq}$) where $n_{PHICH}^{group}$ is the PHICH group number and $n_{PHICH}^{seq}$ is the orthogonal sequence index within the group as defined by:
$n_{PHICH}^{group} = (I_{PRB\_RA} + n_{DMRS}) \bmod N_{PHICH}^{group} + I_{PHICH} N_{PHICH}^{group}$
$n_{PHICH}^{seq} = (\lfloor I_{PRB\_RA}/N_{PHICH}^{group} \rfloor + n_{DMRS}) \bmod 2 N_{SF}^{PHICH}$
where
$n_{DMRS}$ is mapped from the cyclic shift for DMRS field (according to following table 6) in the most recent PDCCH with uplink DCI format [4] for the transport block(s) associated with the corresponding PUSCH transmission. $n_{DMRS}$ shall be set to zero, if there is no PDCCH with uplink DCI format for the same transport block, and if the initial PUSCH for the same transport block is semi-persistently scheduled, or if the initial PUSCH for the same transport block is scheduled by the random access response grant.
$N_{SF}^{PHICH}$ is the spreading factor size used for PHICH modulation as described in section 6.9.1 in [3].

$$I_{PRB\_RA} = \begin{cases} I_{PRB\_RA}^{lowest\_index} & \text{for the first TB of a PUSCH with associated PDCCH or for the case of no associated PDCCH when the number of negatively acknowledged TBs is not equal to the number of TBs indicated in the most recent PDCCH associated with the corresponding PUSCH} \\ I_{PRB\_RA}^{lowest\_index} + 1 & \text{for a second TB of a PUSCH with associated PDCCH} \end{cases}$$

where $I_{PRB\_RA}^{lowest\_index}$ is the lowest PRB index in the first slot of the corresponding PUSCH transmission $N_{PHICH}^{group}$ is the number of PHICH groups configured by higher layers as described in section 6.9 of [3], $$I_{PHICH} = \begin{cases} 1 & \text{for TDD UL/DL configuration 0 with PUSCH transmission in subframe } n = 4 \text{ or } 9 \\ 0 & \text{otherwise} \end{cases}$$

TABLE 6

| TDD UL/DL Configuration | subframe index n | | | | | | | | | |
|---|---|---|---|---|---|---|---|---|---|---|
| | 0 | 1 | 2 | 3 | 4 | 5 | 6 | 7 | 8 | 9 |
| 0 | | | 4 | 7 | 6 | | | 4 | 7 | 6 |
| 1 | | | 4 | 6 | | | | 4 | 6 | |
| 2 | | | 6 | | | | | 6 | | |
| 3 | | | 6 | 6 | 6 | | | | | |
| 4 | | | 6 | 6 | | | | | | |
| 5 | | | 6 | | | | | | | |
| 6 | | | 4 | 6 | 6 | | | 4 | 7 | |

Figure 4:
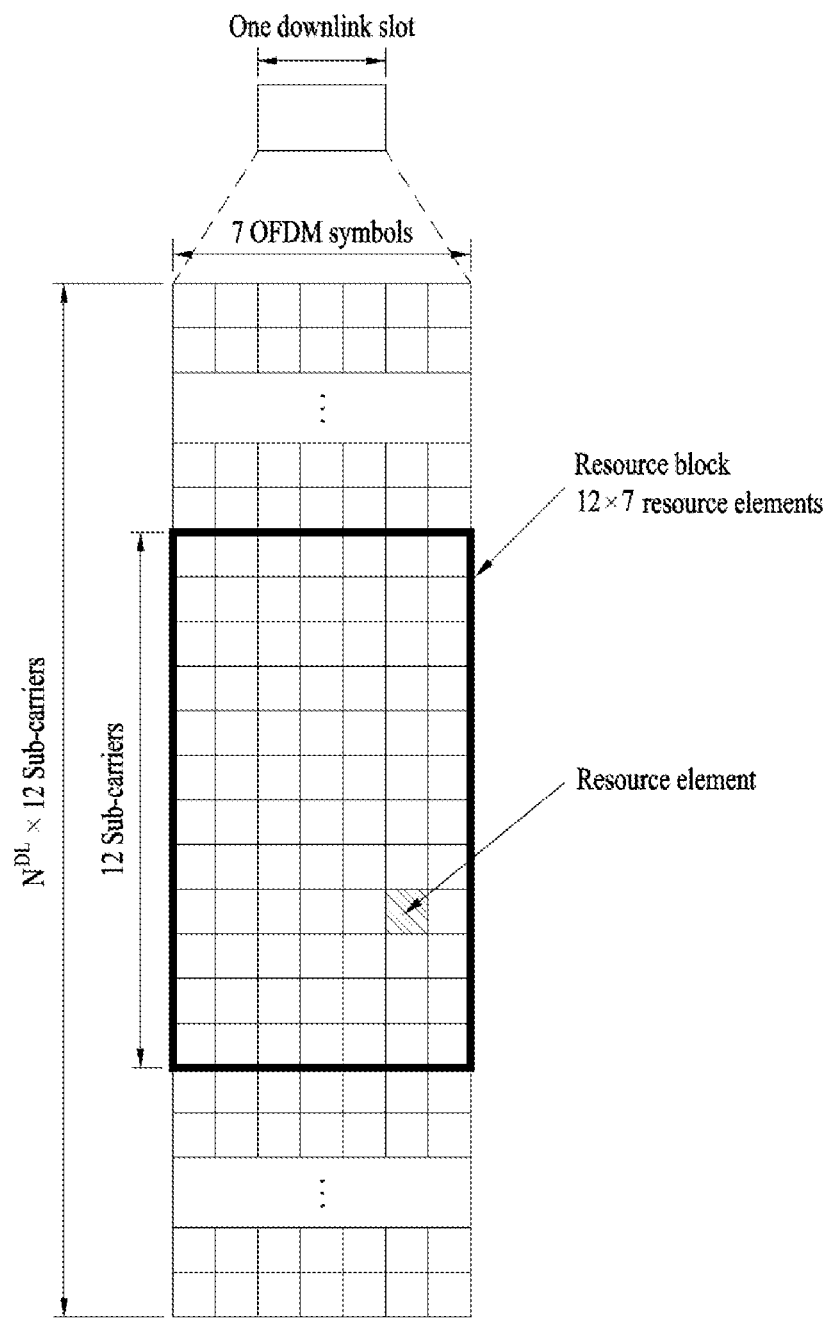
FIG. 4 is a diagram showing a resource grid of a downlink slot of a 3GPP LTE/LTE-A system which is an example of a wireless communication system.

FIG. 4 is a diagram showing a resource grid of a downlink slot of a 3GPP LTE/LTE-A system which is an example of a wireless communication system.

Referring to FIG. 4, a DL slot includes a plurality of OFDM symbols in the time domain One DL slot includes 7 (or 6) OFDM symbols and an RB includes 12 subcarriers in the frequency domain. Each element of the resource grid is referred to as a Resource Element (RE). An RB includes 12×7(6) REs. The number NRB of RBs included in a DL slot depends on a DL transmission bandwidth. A UL slot may have the same structure as a DL slot, except that an OFDM symbol is replaced with an SC-FDMA symbol.

Figure 5:
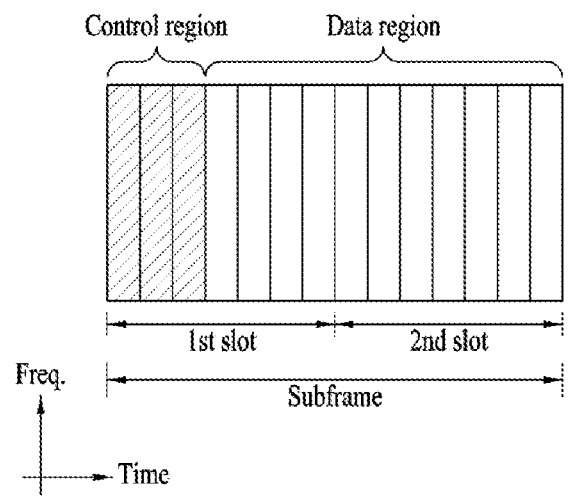
FIG. 5 is a diagram showing the structure of a downlink subframe used in a 3GPP LTE/LTE-A system which is an example of a wireless communication system.

FIG. 5 is a diagram showing the structure of a downlink subframe used in a 3GPP LTE/LTE-A system which is an example of a wireless communication system.

Referring to FIG. 5, a maximum of three (four) OFDM symbols located in a front portion of a first slot within a subframe corresponds to the control region to which a control channel is allocated. The remaining OFDM symbols correspond to the data region to which a physical downlink shared chancel (PDSCH) is allocated. Examples of downlink control channels used in LTE include a physical control format indicator channel (PCFICH), a physical downlink control channel (PDCCH), a physical hybrid ARQ indicator channel (PHICH), etc. The PCFICH is transmitted on a first OFDM symbol of a subframe and carries information regarding the number of OFDM symbols used for transmission of control channels within the subframe. The PHICH is a response to uplink transmission and carries a HARQ acknowledgment (ACK)/negative acknowledgment (NACK) signal.

Control information carried on the PDCCH is called downlink control information (DCI). As a DCI format, format 0 for uplink and formats 1, 1A, 1B, 1C, 1D, 2, 2A, 3 and 3A for downlink are defined. The DCI format selectively includes a hopping flag, RB allocation, modulation coding scheme (MCS), redundancy version (RV), new data indicator (NDI), transmit power control (TPC), cyclic shift demodulation reference signal (DMRS), channel quality information (CQI) request, HARQ process number, transmitted precoding matrix indicator (TPMI), precoding matrix indicator (PMI) confirmation, etc. according to usage thereof.

The PDCCH may deliver information about resource allocation and a transport format for a Downlink Shared Channel (DL-SCH), information about resource allocation and a transport format for an Uplink Shared Channel (UL-SCH), paging information of a Paging Channel (PCH), system information on the DL-SCH, information about resource allocation for a higher-layer control message such as a random access response transmitted on the PDSCH, a set of Tx power control commands for individual UEs of a UE group, a Tx power control command, Voice Over Internet Protocol (VoIP) activation indication information, etc. A plurality of PDCCHs may be transmitted in the control region. The UE may monitor the plurality of PDCCHs. The PDCCH is transmitted on an aggregation of one or several consecutive control channel elements (CCEs). The CCE is a logical allocation unit used to provide the PDCCH with a coding rate based on a state of a radio channel. The CCE corresponds to a plurality of resource element groups (REGs). The format of the PDCCH and the number of PDCCH bits are determined according to the number of CCEs. The base station determines a PDCCH format according to DCI to be transmitted to the UE and attaches cyclic redundancy check to control information. The CRC is masked by a unique Identifier (ID) (e.g. a Radio Network Temporary Identifier (RNTI)) according to the owner or usage of the PDCCH. If the PDCCH is destined for a specific UE, the CRC may be masked by an ID (e.g. a cell-RNTI (C-RNTI)) of the UE. If the PDCCH carries a paging message, the CRC may be masked by a paging ID (e.g. a Paging-RNTI (P-RNTI)). If the PDCCH carries system information, particularly, a System Information Block (SIB), the CRC may be masked by a system information ID (e.g. a System Information RNTI (SI-RNTI)). If the PDCCH is for a random access response, the CRC may be masked by a Random Access-RNTI (RA-RNTI).

Figure 6:
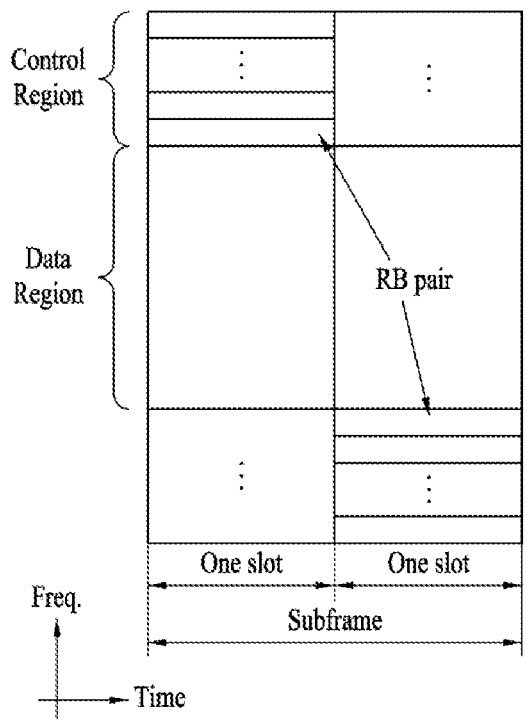
FIG. 6 is a diagram showing the structure of an uplink subframe used in a 3GPP LTE/LTE-A system which is an example of a wireless communication system.

FIG. 6 is a diagram showing the structure of an uplink subframe used in a 3GPP LTE/LTE-A system which is an example of a wireless communication system.

Referring to FIG. 6, the UL subframe includes a plurality (e.g., two) of slots. The slot may include SC-FDMA symbols, the number of which is changed according to CP length. The UL subframe is divided into a control region and a data region in the frequency domain. The data region includes a physical uplink shared channel (PUSCH) and is used to transmit a data signal such as voice. The control region includes a physical uplink control channel (PUCCH) and is used to transmit uplink control information (UCI). The PUCCH includes an RB pair located at both ends of the data region on the frequency axis and hops over a slot boundary.

The PUCCH can be used to transmit the following control information.

Scheduling Request (SR): This is information used to request a UL-SCH resource and is transmitted using an On-Off Keying (OOK) scheme.

HARQ ACK/NACK: This is a response signal to a downlink data packet on a PDSCH and indicates whether the downlink data packet has been successfully received. A 1-bit ACK/NACK signal is transmitted as a response to a single downlink codeword (CW) and a 2-bit ACK/NACK signal is transmitted as a response to two downlink codewords.

Channel Quality Indicator (CQI): This is feedback information about a downlink channel Feedback information regarding MIMO includes a rank indicator (RI), a precoding matrix indicator (PMI), a precoding type indicator (PTI), etc. 20 bits are used per subframe.

The quantity of control information (UCI) that a UE can transmit through a subframe depends on the number of SC-FDMA symbols available for control information transmission. The SC-FDMA symbols available for control information transmission correspond to SC-FDMA symbols other than SC-FDMA symbols of the subframe, which are used for reference signal transmission. In the case of a subframe in which a sounding reference signal (SRS) is configured, the last SC-FDMA symbol of the subframe is excluded from the SC-FDMA symbols available for control information transmission. A reference signal is used to detect coherence of the PUCCH. The PUCCH supports seven formats according to information transmitted thereon.

Spectral efficiency of the FDR Tx/Rx system capable of simultaneously transmitting and receiving UL and DL signals on the same frequency band can be increased twice or less as compared to the legacy system for transmitting/receiving UL and DL signals through division of frequency or time, such that the FDR Tx/Rx system has been highlighted as a core technology of the next-generation 5G mobile communication system.

FUR based on a single frequency transmission band may be defined by a transmission resource configuration scheme capable of simultaneously performing transmission and reception through a single frequency transmission band from the viewpoint of an arbitrary wireless device. As a special example of the FUR, wireless communication between a general BS (or a repeater, a relay node, a remote radio head (RRH), etc.) and a UE can be represented as a Tx resource configuration scheme capable of simultaneously performing not only DL transmission and UL reception of the BS, but also DL reception and UL transmission of a UE through a single frequency Tx band. In another example, under D2D (Device-to-Device) direct communication between the UEs, such wireless communication may be represented as a Tx resource configuration scheme in which Tx and Rx operations between the UEs are simultaneously performed on the same frequency Tx band. Although the following description will disclose exemplary wireless Tx/Rx between a general BS and a UE indicating a wireless terminal and FDR associated technologies for convenience of description, the scope of the present invention may also be applied to a network UE capable of performing wireless Tx/Rx between a general BS and a UE, and may further include an example of D2D direct communication as necessary.

Figure 7:
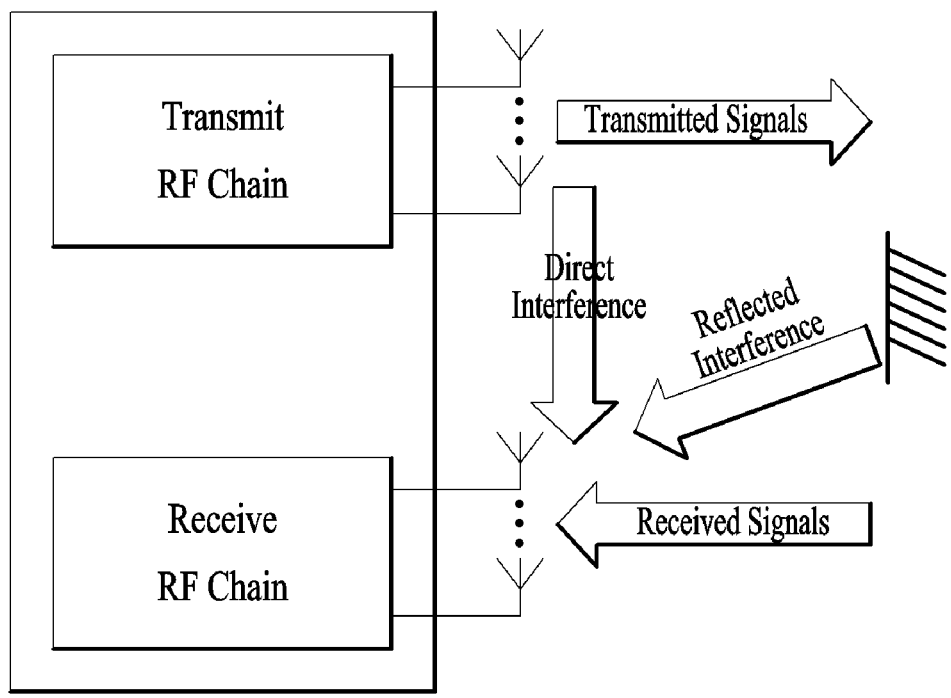
FIG. 7 is a diagram showing the concept of a transmission/reception link and self-interference (SI) in an FDR communication situation.

FIG. 7 is a diagram showing the concept of a transmission/reception link and self-interference (SI) in an FDR communication situation.

As shown in FIG. 7, SI may be divided into direct interference caused when a signal transmitted from a transmit antenna directly enters a receive antenna without path attenuation, and reflected interference reflected by peripheral topology, and the level thereof is dramatically greater than a desired signal due to a physical distance difference. Due to the dramatically large interference intensity, efficient SI cancellation is necessary to operate the FDR system.

To effectively operate the FDR system, self-IC requirements with respect to the maximum transmission power of devices (in the case where FDR is applied to a mobile communication system (BW=20 MHz)) may be determined as illustrated in [Table 7] below.

TABLE 7

| Node Type | Max. Tx Power ($P_A$) | Thermal Noise. (BW = 20 MHz) | Receiver NF | Receiver Thermal Noise Level | Self-IC Target ($P_A$- TN-NF) |
|---|---|---|---|---|---|
| Macro eNB | 46 dBm | −101 dBm | 5 dB (for eNB) | −96 dBm | 142 dB |
| Pico eNB | 30 dBm | | | | 126 dB |
| Femto eNB, WLAN AP | 23 dBm | | | | 119 dB |
| UE | 23 dBm | | 9 dB (for UE) | −92 dBm | 115 dB |

Referring to Table 7, it may be noted that to effectively operate the FDR system in a 20-MHz BW, a UE needs 119-dBm Self-IC performance A thermal noise value may be changed to according to the BW of a mobile communication system. In Table 7, the thermal noise value is calculated on the assumption of a 20-MHz BW. In relation to Table 3, for Receiver Noise Figure (NF), a worst case is considered referring to the 3GPP specification requirements. Receiver Thermal Noise Level is determined to be the sum of a thermal noise value and a receiver NF in a specific BW.

Types of Self-IC Schemes and Methods for Applying the Self-IC Schemes

Figure 8:
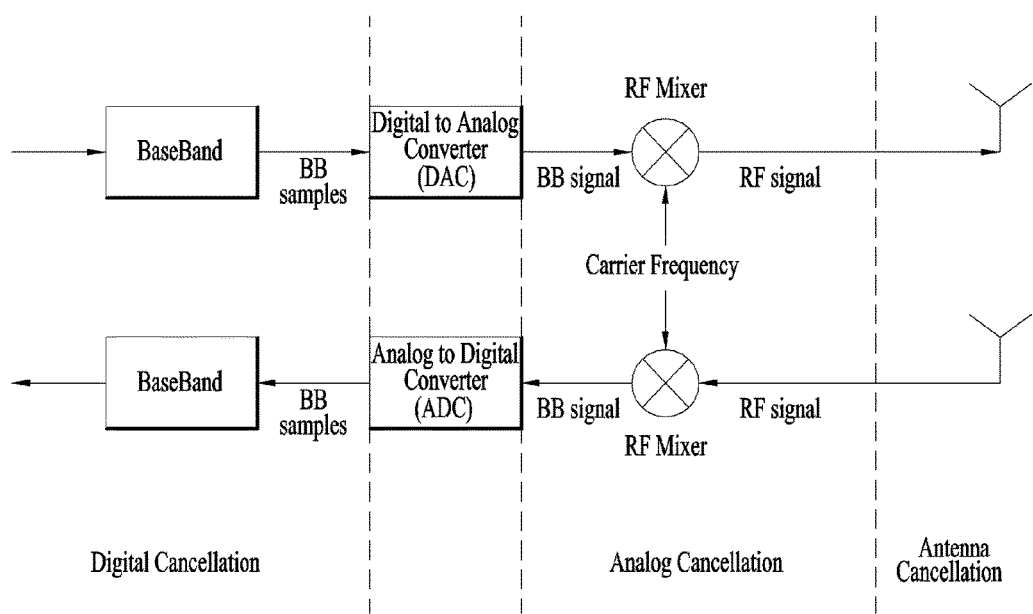
FIG. 8 is a view illustrating positions at which three Self-IC schemes are applied, at a Radio Frequency (RF) Tx and Rx end (or an RF front end) of a device.

FIG. 8 is a view illustrating positions at which three Self-IC schemes are applied, in a Radio Frequency (RF) Tx and Rx end (or an RF front end) of a device. Now, a brief description will be given of the three Self-IC schemes.

Antenna Self-IC: Antenna Self-IC is a Self-IC scheme that should be performed first of all Self-IC schemes. SI is cancelled at an antenna end. Most simply, transfer of an SI signal may be blocked physically by placing a signal-blocking object between a Tx antenna and an Rx antenna, the distance between antennas may be controlled artificially, using multiple antennas, or a part of an SI signal may be canceled through phase inversion of a specific Tx signal. Further, a part of an SI signal may be cancelled by means of multiple polarized antennas or directional antennas.

Analog Self-IC: Interference is canceled at an analog end before an Rx signal passes through an Analog-to-Digital Convertor (ADC). An SI signal is canceled using a duplicated analog signal. This operation may be performed in an RF region or an Intermediate Frequency (IF) region. SI signal cancellation may be performed in the following specific method. A duplicate of an actually received SI signal is generated by delaying an analog Tx signal and controlling the amplitude and phase of the delayed Tx signal, and subtracted from a signal received at an Rx antenna. However, due to the analog signal-based processing, the resulting implementation complexity and circuit characteristics may cause additional distortion, thereby changing interference cancellation performance significantly.

Digital Self-IC: Interference is canceled after an Rx signal passes through an ADC. Digital Self-IC covers all IC techniques performed in a baseband region. Most simply, a duplicate of an SI signal is generated using a digital Tx signal and subtracted from an Rx digital signal. Or techniques of performing precoding/postcoding in a baseband using multiple antennas so that a Tx signal of a UE or an eNB may not be received at an Rx antenna may be classified into digital Self-IC. However, since digital Self-IC is viable only when a digital modulated signal is quantized to a level enough to recover information of a desired signal, there is a need for the prerequisite that the difference between the signal powers of a designed signal and an interference signal remaining after interference cancellation in one of the above-described techniques should fall into an ADC range, to perform digital Self-IC.

Figure 9:
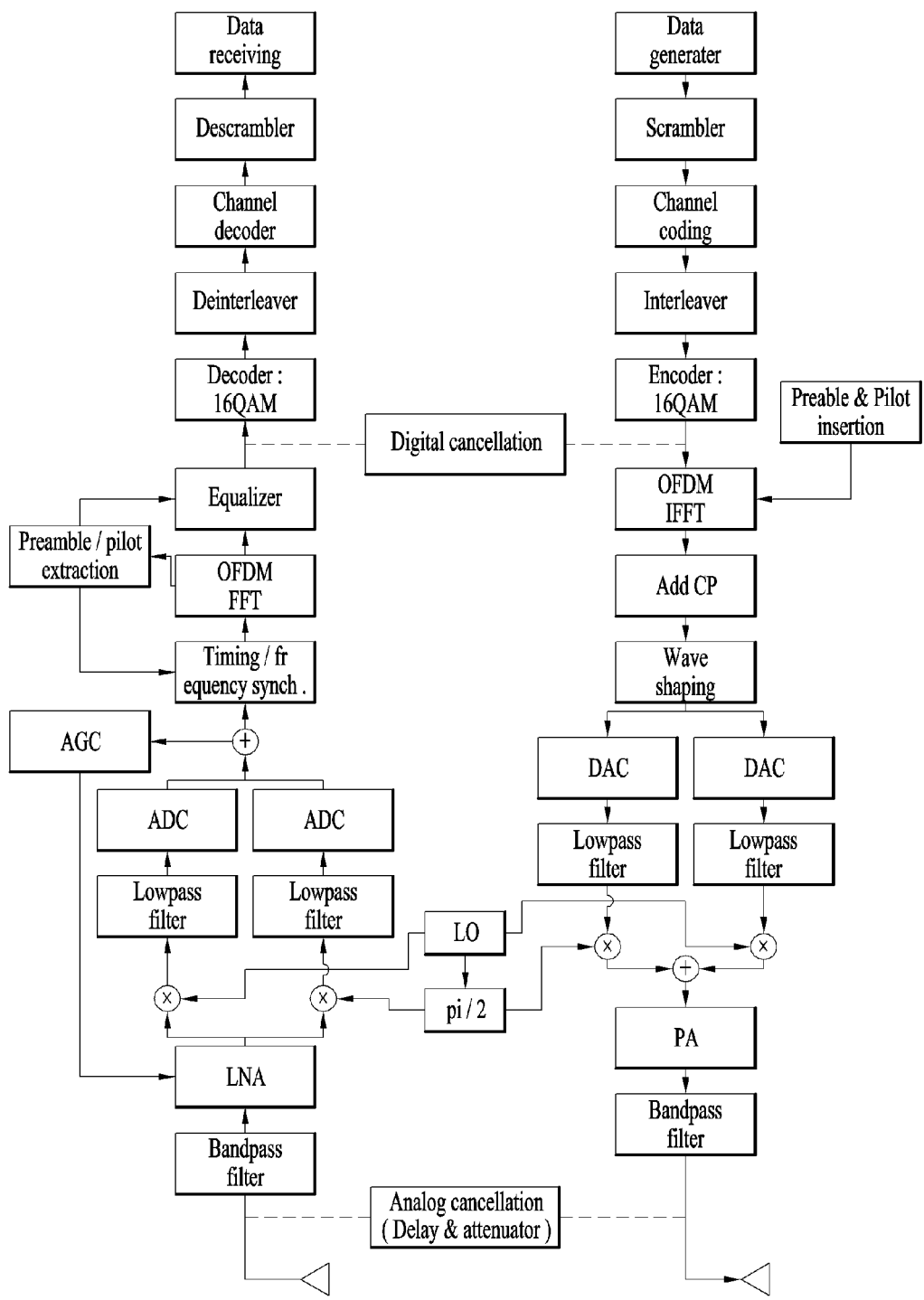
FIG. 9 is a block diagram of a Self-IC device in a proposed communication apparatus in an OFDM communication environment based on FIG. 8.

FIG. 9 is a block diagram of a Self-IC device in a proposed communication apparatus in an OFDM communication environment based on FIG. 8.

While FIG. 9 shows that digital Self-IC is performed using digital SI information before Digital to Analog Conversion (DAC) and after ADC, it may be performed using a digital SI signal after Inverse Fast Fourier Transform (IFFT) and before Fast Fourier Transform (FFT). Further, although FIG. 9 is a conceptual view of Self-IC though separation of a Tx antenna from an Rx antenna, if antenna Self-IC is performed using a single antenna, the antenna may be configured in a different manner from in FIG. 5.

As different kinds of interference encountered when the FDR transmission scheme is used, a multi-user interference may be used. The multi-user interference may be defined as a phenomenon in which device signals transmitted through the same frequency band from among a plurality of FDR-based devices spaced apart from each other by a relatively short distance are input, as an interference signal, to each device capable of receiving the signal through the corresponding frequency band, or may also be defined as a phenomenon in which a UL transmission signal transmitted by another TDD configuration within the same cell is input as an interference signal during reception of a DL transmission signal.

The present invention will disclose a frame structure for a User-specific (or UE-specific) dynamic TDD scheme and a HARQ transmission method needed to manage the frame structure, as an interim stage for practical evolution of FDR technology in which an arbitrary wireless device simultaneously performs transmission and reception over a single frequency transmission band.

Figure 10:
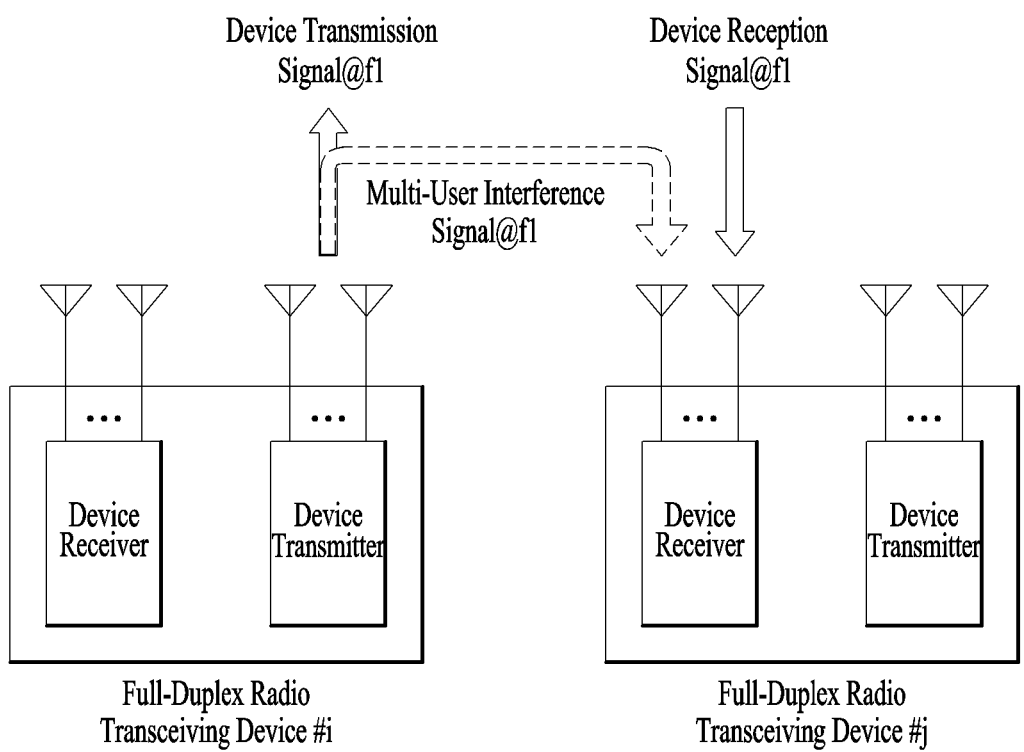
FIG. 10 is a conceptual diagram illustrating multi-user interference encountered between two wireless devices based on FDR.

FIG. 10 is a conceptual diagram illustrating multi-user interference encountered between two wireless devices based on FDR.

Multi-user interference conceptually shown in FIG. 10 may be affected by proximity between device positions and transmission (Tx) power strengths of the devices. For example, as the distance between a Tx wireless device and a reception (Rx) wireless device on an arbitrary reference Tx power is gradually reduced and the Tx power strength of each wireless device is gradually increased, the multi-user interference strength applied to the corresponding wireless device reception unit is gradually increased Characteristics for individual interference types encountered by the above FDR application are shown in the following Table 8.

TABLE 8

| Interference Types | Detection of Modulation Symbol Information | Interference Signal Strength | Factors determining interference influence |
| --- | --- | --- | --- |
| Self-Interference | O | Very Large | Power ratio of self-interference signal to received signal |
| Multi-user interference | X | Variable | Distance to interference device, Tx power of interference device |

Effective mitigation or cancellation of multi-user interference by a digital baseband scheme such as transmission resource scheduling, power control, multi-antenna beamforming, and the like, and a wireless resource scheduling scheme may be considered. On the other hand, processing self-interference involves the requirement that an Analog-to-Digital Converter (ADC) of a receiver performs digital quantization on a received signal without distortion as intended, only when an interference signal of at least 60 dB and up to 100 dB or more is canceled according to a wireless network coverage (network node transmission power) condition and a transmission rate matching situation before processing in the ADC, in consideration of the worst situation with maximum transmission power and minimum reception sensibility.

Considering that lots of implementation complexity and processing cost are taken to enable a receiver of a wireless device to cancel self-interference before the ADC stage, a transmission scheme for efficiently reducing implementation complexity and processing cost, while achieving a gain that FDR conceptually seeks may be considered.

Figure 11:
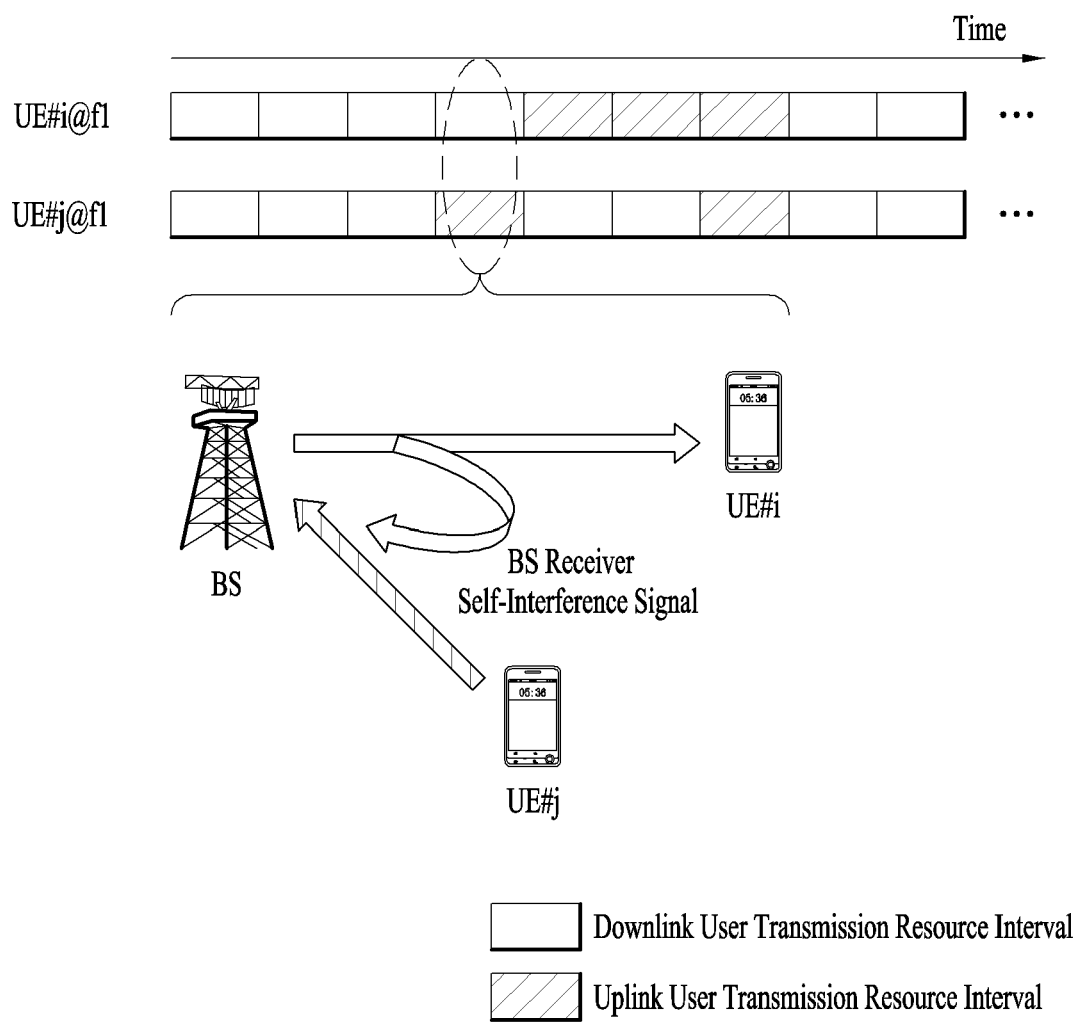
FIG. 11 is a conceptual diagram illustrating an example of a UE-specific dynamic TDD radio transmission scheme between a base station (BS) and a user equipment (UE).

The present invention proposes a User-specific dynamic TDD transmission scheme in order to increase the frequency use efficiency of a system, support the asymmetry of user-wise UL/DL data as much as possible, and confine self-interference to a receiver of a BS, as shown in FIG. 11.

FIG. 11 is a conceptual diagram illustrating an example of a UE-specific Dynamic TDD radio transmission scheme between a base station (BS) and a user equipment (UE).

Referring to FIG. 11, user-specific dynamic TDD wireless communication is a scheme of configuring a DL time interval resource and a UL time interval resource uniquely for each UE according to a service or an application program of the individual UE. A time interval resource generically refers to a time slot, a subframe, or a frame, which includes one or more transmission symbols. Wireless communication resource allocation optimized for the characteristics of an individual UE-wise service and application may be supported, and at the same time, the gain of increasing the total frequency use efficiency of BS coverage may be achieved, by user-specific dynamic TDD wireless communication.

If the user-specific dynamic TDD transmission scheme proposed by the present invention is applied to wireless communication between a BS and a UE, a UL signal transmission operation and a DL signal reception operation of the UE are distinguished from each other without overlap in the time domain, no self-interference occurs in the UE. On the contrary, when a DL transmitter in the BS transmits a DL signal to another UE at a time of receiving a signal from the UE at a UL receiver in the BS, self-interference may occur in the BS. Compared to FDR, the user-specific dynamic TDD transmission scheme has the following characteristics listed in the following Table 9 in wireless communication between a BS and a UE.

TABLE 9

| Characteristic element | user-specific dynamic TDD | Full-Duplex Radio (FDR) |
|---|---|---|
| Frequency efficiency | Total frequency use efficiency is increased on a BS basis. | Frequency use efficiency is increased on a user basis. |
| User UL/DL resource configuration | User-wise flexible | User-wise flexible |
| UE interference element | Multi-user interference | Self-interference, Multi-user interference |
| BS interference element | Self-interference, Multi-user interference | Self-interference, multi-user interference |

Hereinbelow, the present invention proposes techniques for effectively applying the user-specific dynamic TDD transmission scheme to wireless communication between a BS and a UE. The term "BS' may conceptually include a repeater, a relay node, a remote radio head (RRH), etc.

Radio Frame Resource Structure Dedicated for User-Specific Dynamic TDD Transmission Scheme Design references of a radio frame resource structure when the user-specific dynamic TDD transmission scheme is applied to wireless transmission between a UE and a BS are as follows.

Subframe: A subframe is a minimum Tx/Rx event time unit (a unit of scheduling (Transmission Time Interval: TTI), or a continuous Tx/Rx duration) in userspecific dynamic TDD transmission. A subframe includes $N_{sys}$ OFDM symbols. If the basic resource configuration of the 3GPP LTE system is adopted, a subframe may include 14 OFDM symbols in a normal CP case and 12 OFDM symbols in an extended CP case, and may be divided into two slots.

Radio frame: A radio frame is a maximum transmission unit in user-specific dynamic TDD transmission, including $N_{tot}$ subframes. If the basic resource configuration of the 3GPP LTE system is adopted, the radio frame may include 10 subframes.

Downlink subframe: A downlink subframe is a subframe for DL transmission on a BS-UE link.

Uplink subframe: An uplink subframe is a subframe for UL transmission on a BS-UE link.

Special subframe: To prevent overlap between a transmission interval and a reception interval caused by a propagation delay and a Timing Advance (TA) mechanism used for UL reception synchronization in switching from a DL frame to a UL frame on a BS-UE link, it is necessary to secure a guard time equal to or longer than the round trip delay of the link. To support this, a special frame is defined and includes a DL transmission symbol, a guard interval symbol, and a UL transmission symbol.

The following embodiment of the present invention proposes a resource configuration of a radio frame, dedicated to user-specific dynamic TDD transmission.

Embodiment 1: Radio Frame Structure Based on User-Specific Dynamic TDD Transmission Scheme Having a Period of One Frame or a Half Frame In an uplink-downlink (UL-DL) configuration of a typical LTE TDD, when an UL Switch-point periodicity is set to 5 ms, subframes (#0, #1, #2) may be fixed in the order of Downlink (D)→Special (S)→Uplink (U), and subframes (#5, #6, #7) may also be fixed in the order of Downlink (D)→Special (S)→Uplink (U). When a Downlink-to-Uplink (DL-to-UL) switch-point periodicity is set to 10 ms, subframes (#0, #1, #2) may be fixed in the order of Downlink (D)→Special (S)→Uplink (U). However, the BS capable of performing FDR transmission can perform downlink transmission in a reception condition of UL transmission on the condition that self-interference cancellation performance is guaranteed. As a result, the fixed D-S-U structures can be modified on the basis of not only information as to whether UE-specific dynamic TDD transmission is supported, but also traffic and latency situations of the UE.

For example, in association with the user-specific dynamic TDD transmission scheme, an arbitrary radio frame may be configured in a manner that common subframes of all users in an arbitrary cell or system are set to D and S subframes, and the remaining subframes other than the D and S subframes are set to user-specifically configured subframes (X) that include a DL subframe (D), a UL subframe (U), or a special subframe (S) specific for each UE.

As shown in the example of FIG. 12, the proposed user-common (or UE-common) configuration subframe may include two subframes (i.e., a DL subframe D and a special subframe S), and the remaining subframes are defined as user-specifically configured subframes (X).

FIG. 12 is a view illustrating design references of a radio frame resource structure based on a user-specific dynamic TDD transmission scheme.

Referring to FIG. 12, user-common subframes may be located at the beginning of the radio frame. The user-common subframes may include a DL subframe (D) and a special subframe (S), and the remaining subframes may include user-specific (i.e., UE-specific) subframes.

In accordance with the radio frame design references based on the user-specific dynamic TDD transmission scheme, an embodiment of a frame structure composed of a user-common subframe (i.e., a user-common subframe) interval and a user-specific subframe (i.e., UE-specific subframe) interval is shown in FIG. 13.

FIG. 13 is a view illustrating references of a radio frame resource structure based on a user-specific dynamic TDD transmission scheme.

Referring to FIG. 13, the best basic structure based on matching characteristics and frequency efficiency associated with the legacy 3GPP LTE TDD system may be located after the UL subframe after lapse of a user-common subframe interval. In addition, when switching from the DL subframe to the UL subrame, a special subframe is needed. In contrast, when switching from the UL subframe to the DL subframe, such switching may be immediately switched without using the special subframe. While one user-common subframe interval is defined per frame in FIG. 13, this is done for the purpose of performance optimization. In other words, the period of a user-common subframe interval (or a special subframe) is one radio subframe length. On the other hand, to reduce a transmission delay of data/control information through system UL and DL synchronization or fast switching from UL to DL, a structure in which plural user-common subframe intervals are configured in a radio frame by making the gaps between the intervals equal or as equal as possible may be applied.

FIG. 14 is a view illustrating an example of representing the frame structure of FIG. 13 as a user-specific dynamic TDD radio frame structure matched with a 3GPP LTE radio frame structure.

Referring to FIG. 14, one radio frame includes 10 subframes as shown in the 3GPP LTE radio frame structure, resulting in $N_{tot}=10$. For example, the number of UL subframes located after the user-common subframe may be set to 3 ($N_U=3$), and the number of DL subframes located after the user-common subframe may be set to 5 ($N_D=5$).

For possible cases of $N_U$ and $N_D$, DL-UL resource ratios (except for a special subframe) are given as follows in FIG. 14.

$\{N_U,N_D\}=\{0:8\}\leftarrow$DL:UL=9:0
$\{N_U,N_D\}=\{1:7\}\leftarrow$DL:UL=8:1
$\{N_U,N_D\}=\{2:6\}\leftarrow$DL:UL=7:2
$\{N_U,N_D\}=\{3:5\}\leftarrow$DL:UL=6:3
$\{N_U,N_D\}=\{4:4\}\leftarrow$DL:UL=5:4
$\{N_U,N_D\}=\{5:3\}\leftarrow$DL:UL=4:5
$\{N_U,N_D\}=\{6:2\}\leftarrow$DL:UL=3:6
$\{N_U,N_D\}=\{7:1\}\leftarrow$DL:UL=2:7
$\{N_U,N_D\}=\{8:0\}\leftarrow$DL:UL=1:8

FIG. 15 is a view illustrating an example of a radio frame structure based on a user-specific dynamic TDD transmission scheme having two user-common subframe intervals.

Referring to FIG. 15, a single radio frame having a predetermined length may include two user-common subframe intervals and two UE-specific subframe intervals. Although the above-mentioned structure is basically based on the fact that the user-common subframe intervals are arranged periodically at an interval of half the length of a radio frame in the structure of FIG. 15, the user-common subframe intervals may be arranged in a pattern other than the equidistant arrangement.

FIG. 16 is a view illustrating an example of a frame structure based on a user-specific dynamic TDD transmission scheme having two user-common subframe intervals matched with a 3GPP LTE radio frame structure.

In FIG. 16, a total of 6 subframes from among 10 subframes contained in a 10 ms radio frame may operate as a user specific flexible subframes (i.e., UE-specific flexible subframes) which may be configured as UL subframes or DL subframes for each user (each UE) according to a situation of each user (or each UE). Examples of possible configurations of the flexible subframes are given as follows according to the order of the positions of the flexible subframes illustrated in FIG. 16.

$\{X,X,X,X,X,X\}=\{D,D,D,D,D,D\}\leftarrow$DL:UL resource configuration ratio 8:0

$\{X,X,X,X,X,X\}=\{U,D,D,D,D,D\}$ or $\{D,D,D,U,D,D\}\leftarrow$DL:UL resource configuration ratio 7:1

$\{X,X,X,X,X,X\}=\{U,D,D,U,D,D\}$ or $\{U,U,D,D,D,D\}$ or $\{D,D,D,U,U,D\}\leftarrow$DL:UL resource configuration ratio 6:2

$\{X,X,X,X,X,X\}=\{U,U,D,U,D,D\}$ or $\{U,D,D,U,U,D\}$ or $\{D,D,D,U,U,U\}$ or $\{U,U,U,D,D,D\}\leftarrow$DL:UL resource configuration ratio 5:3

$\{X,X,X,X,X,X\}=\{U,U,D,U,U,D\}$ or $\{U,U,U,U,D,D\}$ or $\{U,D,D,U,U,U\}\leftarrow$DL:UL resource configuration ratio 4:4

$\{X,X,X,X,X,X\}=\{U,U,D,U,U,D\}$ or $\{U,U,D,U,U,U\}\leftarrow$DL:UL resource configuration ratio 3:5

$\{X,X,X,X,X,X\}=\{U,U,U,U,U,U\}\leftarrow$DL:UL resource configuration ratio 2:6

Embodiment 2: Radio Frame Structure Based on User-Specific Dynamic TDD Transmission Scheme Having a Period of at Least One Frame In Embodiment 1, when the DL-UL resource ratio having one frame period is set to 9:0 and the DL-UL resource ratio having a half frame period is set to 8:0, UL resource allocation is not achieved during a single frame interval. If UL transmission must be achieved in the next frame, UL transmission is first achieved in a third subframe ($3^{rd}$ subframe) of the next frame according to the frame structure of the embodiment 1. In this case, a minimum delay of 12 ms may occur as a delay generated in feedback (when configuration 0 and another configuration having DL:UL=9:0 in the first embodiment 1 are arranged). In order to reduce such delay of 12 ms, UL transmission must be rapidly achieved in the next frame.

In addition, in order to temporarily reduce latency for UL transmission as a DL feedback using a request signal, the frame structure according to the embodiment must be designed in a different way from the legacy frame structure.

Therefore, in association with the user-specific dynamic TDD transmission scheme, subframes commonly configured in all users in an arbitrary cell or system are changed to a special subframe (S) and a UL subframe (U), and the remaining subframes may be set to user-specifically configured subframes (X) that include a DL subframe (D), a UL subframe (U), or a special subframe (S) specific for each UE. In this case, DwPTS of the special subframe (S) located at the start of the frame may include Primary Synchronisation Signal (PSS)/Secondary Synchronisation Signal (SSS) for synchronization, a reference signal (S) for channel estimation, a Physical Downlink Control Channel (PDCCH) for carrying control information, and a physical broadcast channel (PBCH) for broadcasting.

The above-mentioned modified user-common configuration subframes are configured in a manner that first two subframes are arranged in the order of Special subframe (S)→UL subframe (U), and the remaining subframes other than the first two subframes are composed of user-specifically (User-specifically) configured subframes (X), as shown in FIG. 17.

FIG. 17 is a view illustrating an example of a modified radio frame resource structure based on a user-specific dynamic TDD transmission scheme.

In FIG. 17, the modified radio frame resource structure may start from the special subframe (S) but not the DL subframe (D). Since the radio frame starts from the special subframe (S), the legacy DL subframe structure must be partially used to facilitate system operation, a PSS/SSS for synchronizing with a DwPTS of the special subframe, a reference signal (RS) for channel estimation, a PDCCH for carrying control information, and a PBCH for broadcasting, and respective positions of PSS/SSS, RS, PDCCH, and PBCH may be changed according to a matched system structure.

Although the best basic structure based on matching characteristics and frequency efficiency associated with the legacy 3GPP LTE TDD system may be located after the UL subframe after lapse of a user-common subframe interval, it should be noted that the modified user-common subframe is ended as the UL subframe so that the DL subframe may be located subsequent to the user-common subframe.

FIG. 18 is a view illustrating an example of representing the frame structure of FIG. 17 as a user-specific dynamic TDD frame structure matched with a 3GPP LTE/LTE-A radio frame structure.

Referring to FIG. 18, assuming that the last subframe of a previous frame is a DL subframe (D) while being matched with the 3GPP LTE/LTE-A radio frame structure, matching of the proposed frame structure can be achieved. A detailed description thereof is as follows. In this case, DwPTS of the special subframe (S) located at the first subframe of the frame may allow the positions of the RS for channel estimation, the PDCCH for carrying control information, and the PBCH for broadcasting to be identical to the position of the DL subframe (S) located at the start of the frame of the legacy 3GPP LTE/LTE-A system, and may thus perform matching between RS, PDCCH, and PBCH. In addition, PSS/SSS for synchronization may be located at the last symbol of the previous frame and a fourth symbol of the next frame so that LTE-TDD detection can be performed and time synchronization can also be acquired. An example of the special subframe configuration 4 is as follows.

Figure 19:
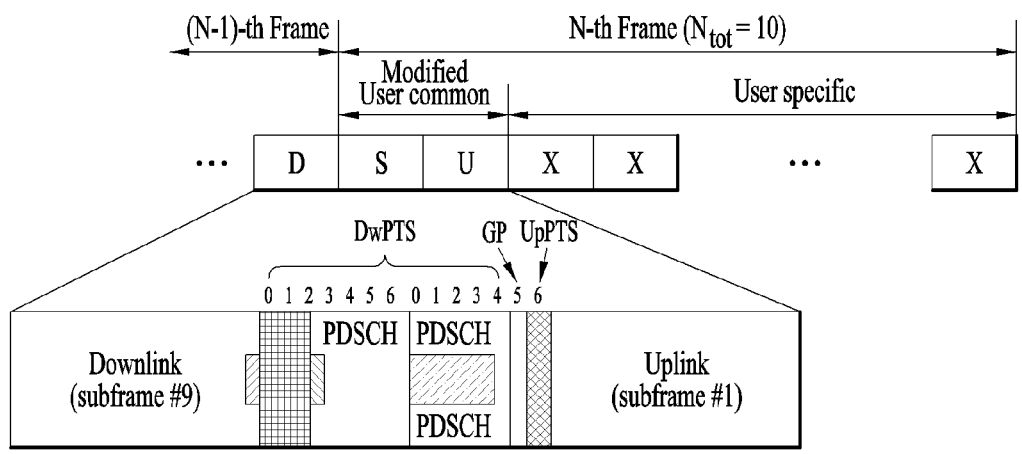
FIG. 19 is a view illustrating a detailed structure of a modified radio frame based on a user-specific dynamic TDD transmission scheme matched with a 3GPP LTE/LTE-A radio frame structure.

FIG. 19 is a view illustrating a detailed structure of a modified radio frame based on a user-specific dynamic TDD transmission scheme matched with a 3GPP LTE/LTE-A radio frame structure.

In the case of using the special subframe configuration 4, the special subframe configuration 3, and the special subframe configuration 8, the positions of PSS/SSS, RS, PDCCH, and PBCH may be identical to those of FIG. 18. However, in the case of using other special subframe configurations other than the above-mentioned configurations, the positions of PSS/SSS, RS, PDCCH, and PBCH may be changed or omitted. In order to allow the UEs to recognize the modified frame structure, the following two methods may be used.

First, through higher information (or higher layer signaling (for example, RRC)) or an instructor (i.e., a frag signal) at the broadcast signal, the BS may inform the UE of the modified frame structure.

Second, the BS may implicitly inform the UE of the modified frame structure through detection of PSS/SS position change on the basis of an internal counter of each UE.

In FIG. 18, in association with the number of possible cases of $N_U$ and $N_D$, DL-UL resource ratios are given as follows.

$\{N_U, N_D\} = \{0:8\} \leftarrow$ DL:UL=8:1
$\{N_U, N_D\} = \{1:7\} \leftarrow$ DL:UL=7:2
$\{N_U, N_D\} = \{2:6\} \leftarrow$ DL:UL=6:3
$\{N_U, N_D\} = \{3:5\} \leftarrow$ DL:UL=5:4
$\{N_U, N_D\} = \{4:4\} \leftarrow$ DL:UL=4:5
$\{N_U, N_D\} = \{5:3\} \leftarrow$ DL:UL=3:6
$\{N_U, N_D\} = \{6:2\} \leftarrow$ DL:UL=2:7
$\{N_U, N_D\} = \{7:1\} \leftarrow$ DL:UL=1:8
$\{N_U, N_D\} = \{8:0\} \leftarrow$ DL:UL=0:9

Embodiment 3: HARQ Transmission Timing in Radio Frame Structure Based on User-Specific Dynamic TDD Transmission Scheme Having a Period of One Frame In order to construct the UE-specific dynamic TDD transmission scheme in Embodiment 1, HARQ transmission time must be defined. In the legacy cell-specific TDD configuration, the ACK/NACK transmission interval may be cell-specifically fixed due to the fixed UL-DL configuration. However, since the respective UEs have different UL-DL configurations in the user-specific dynamic TDD, the ACK/NACK transmission time (subframe) must be designated appropriately for each configuration. Although the proposed invention will disclose ACK/NACK using a PHICH and a PUCCH needed for ACK/NACK transmission, it should be noted that the ACK/NACK can also be transmitted using other physical channels (e.g., e-PHICH, PDSCH, PUSCH) as necessary.

In association with a PDCCH for scheduling a PDSCH or PUSCH for wireless communication between a BS and a UE according to a frame of the user-specific dynamic TDD transmission scheme, a PUCCH transmission time for transmitting ACK/NACK needs to be configured in the PDCCH. A method for such time configuration is as follows.

At a transmission time of a PDCCH for scheduling a PDSCH, the UE may transmit a PUCCH at the nearest UL subframe that is longer than the PDCCH transmission time by a minimum of 4 ms.

PUCCH distribution is achieved according to the following references, such that the PUCCH transmitted from each UL subframe is uniformly distributed and a bundling window size (M) does not have a high value at a specific subframe.

When (# of DL subframe)/(# of UL subframe)(the ratio of the number of DL subframes to the number of UL subframes) is less than 2, a PUCCH transmission time is configured in a UL subframe in association with one PDSCH or a PDCCH for scheduling the PDSCH. Thereafter, PUCCH transmission for the next PDSCH or a PDCCH for scheduling the PDSCH may be achieved using the next UL subframe. In addition, if the PUCCH transmission time is configured in all UL subframes, PUCCH for the next PDSCH or a PDCCH for scheduling the PDSCH may be cyclically transmitted using the next UL subframe.

When (# of DL subframe)/(# of UL subframe)(the ratio of the number of DL subframes to the number of UL subframe) is equal to or higher than 2, a PUCCH transmission time is configured in a manner that the value of M in one UL subframe is set to 2. Thereafter, PUCCH transmission for the next PDSCH or a PDCCH for scheduling the PDSCH may be configured in a manner that the M value in the next UL subframe is set to 2. In addition, assuming that a PUCCH transmission time is configured in all UL subframes, a PUCCH for the next PUSCH or a PDCCH for scheduling the PDSCH may be transmitted cyclically using the next UL subframe.

The present invention proposes a PUCCH timing configuration method for ACK/NACK transmission on the basis of the design references. For convenience of description, DL/UL switch point periodicity in 3GPP LTE/LTE-A is classified into two cases (10 ms and 5 ms), and the UL-DL subframe ratio for each case of 10 ms or 5 ms will hereinafter be described.

10 ms DL/UL switch point periodicity

A. $\{N_U, N_D\} = \{0:8\} \leftarrow$ DL:UL=9:0

In the frame proposed by A, a UL subframe is not present, such that PUCCH must be transmitted using the following frame.

B. $\{N_U, N_D\} = \{1:7\} \leftarrow$ DL:UL=8:1

A user equipment (UE) may transmit a PUCCH at a subframe corresponding to the subframe number 2 so as to transmit ACK/NACK for the DL subframe. Assuming that the subframe number for PUCCH transmission is defined as 'n' and the transmission position of a PDCCH for scheduling a PDSCH or the PDSCH associated with ACK/NACK transmitted through a PUCCH is defined as 'n–k', the set (K) of k values (bundling window size) may be represented by the following Table 10. In this case, when the K size is defined by M, K: $\{k_0, k_1, \ldots, k_{M-1}\}$ may be obtained. It is assumed that the corresponding DL/UL configuration is set to UL/DL configuration 0. In the following table 10, a downlink association set index K: $\{k_0, k_1, \ldots, k_{M-1}\}$ may be defined.

TABLE 10

| UL/DL configuration | Subframe n | | | | | | | | | |
|---|---|---|---|---|---|---|---|---|---|---|
| | 0 | 1 | 2 | 3 | 4 | 5 | 6 | 7 | 8 | 9 |
| 0 | | | 13, 12, 11, 9, 8, 7, 6, 5, 4 | | | | | | | |

C. $\{N_U, N_D\} = \{2:6\} \leftarrow$ DL:UL=7:2

The UE may transmit a PUCCH at subframes (Subframe #2, Subframe #3) so as to transmit ACK/NACK for a DL subframe. It is assumed that the corresponding DL/UL configuration is set to UL/DL configuration 1. In the case of UL/DL configuration 1, a transmission position of either a PDSCH connected to ACK/NACK transmitted over a PUCCH or a PDCCH for scheduling the PDSCH is defined as 'n–k', the set (K) of k values (bundling window size) may be represented by the following Table 11 (Downlink association set index K: $\{k_0, k_1, \ldots, k_{M-1}\}$).

TABLE 11

| UL/DL configuration | Subframe n | | | | | | | | | |
|---|---|---|---|---|---|---|---|---|---|---|
| | 0 | 1 | 2 | 3 | 4 | 5 | 6 | 7 | 8 | 9 |
| 1 | | | 12, 11, 8, 7 | 7, 6, 5, 4 | | | | | | |

D. $\{N_U, N_D\} = \{3:5\} \leftarrow$ DL:UL=6:3

The UE may transmit s PUCCH at the subframes (subframe #2, subframe #3, subframe #4) so as to transmit ACK/NACK for the DL subframe. It is assumed that the corresponding DL/UL configuration is set to UL/DL configuration 2. In the case of UL/DL configuration 2, a transmission position of either a PDSCH connected to ACK/NACK transmitted over a PUCCH or a PDCCH for scheduling the PDSCH is defined as 'n–k', the set (K) of k values (bundling window s ize) may be represented by the following Table 12 (Downlink association set index K: $\{k_0, k_1, \ldots, k_{M-1}\}$).

TABLE 12

| UL/DL configuration | Subframe n | | | | | | | | | |
|---|---|---|---|---|---|---|---|---|---|---|
| | 0 | 1 | 2 | 3 | 4 | 5 | 6 | 7 | 8 | 9 |
| 2 | | | 11, 7, 6 | 6, 5 | 5, 4 | | | | | z |

E. $\{N_U, N_D\} = \{4:4\} \leftarrow$ DL:UL=5:4

The UE may transmit a PUCCH at the subframes (subframe #2, subframe #3, subframe #4, subframe #5) so as to transmit ACK/NACK for the DL subframe. It is assumed that the corresponding DL/UL configuration is set to UL/DL configuration 3. In the case of UL/DL configuration 3, a transmission position of either a PDSCH connected to ACK/NACK transmitted over a PUCCH or a PDCCH for scheduling the PDSCH is defined as 'n–k', the set (K) of k values (bundling window size) may be represented by the following Table 13 (Downlink association set index K: $\{k_0, k_1, \ldots, k_{M-1}\}$).

TABLE 13

| UL/DL configuration | Subframe n | | | | | | | | | |
|---|---|---|---|---|---|---|---|---|---|---|
| | 0 | 1 | 2 | 3 | 4 | 5 | 6 | 7 | 8 | 9 |
| 3 | | | 6, 5 | 5, 4 | 4 | 4 | | | | z |

F. $\{N_U, N_D\} = \{5:3\} \leftarrow$ DL:UL=4:5

The UE may transmit a PUCCH at the subframes (subframe #2, subframe #3, subframe #4, subframe #5, subframe #6) so as to transmit ACK/NACK for the DL subframe. It is assumed that the corresponding DL/UL configuration is set to UL/DL configuration 4. In the case of UL/DL configuration 4, a transmission position of either a PDSCH connected to ACK/NACK transmitted over a PUCCH or a PDCCH for scheduling the PDSCH is defined as 'n–k', the set (K) of k values (bundling window size) may be represented by the following Table 14 (Downlink association set index K: $\{k_0, k_1, \ldots, k_{M-1}\}$).

TABLE 14

| UL/DL configuration | Subframe n | | | | | | | | | |
|---|---|---|---|---|---|---|---|---|---|---|
| | 0 | 1 | 2 | 3 | 4 | 5 | 6 | 7 | 8 | 9 |
| 4 | | | 5 | 5 | 5 | 5 | 5 | | | z |

G. $\{N_U, N_D\} = \{6:2\} \leftarrow$ DL:UL=3:6

The UE may transmit a PUCCH at the subframes (subframe #2, subframe #3, subframe #4, subframe #5) so as to transmit ACK/NACK for the DL subframe. It is assumed that the corresponding DL/UL configuration is set to UL/DL configuration 5. In the case of UL/DL configuration 5, a transmission position of either a PDSCH connected to ACK/NACK transmitted over a PUCCH or a PDCCH for scheduling the PDSCH is defined as 'n–k', the set (K) of k values (bundling window size) may be represented by the following Table 15 (Downlink association set index K: $\{k_0, k_1, \ldots, k_{M-1}\}$).

| UL/DL | Subframe n | | | | | | | | | |
|---|---|---|---|---|---|---|---|---|---|---|
| configuration | 0 | 1 | 2 | 3 | 4 | 5 | 6 | 7 | 8 | 9 |
| 5 | | | | 4 | 4 | 4 | 4 | | | z |

H. $\{N_U, N_D\}$=17:11 DL:UL=2:7

The UE may transmit a PUCCH at the subframes (subframe #3, subframe #4, subframe #5) so as to transmit ACK/NACK for the DL subframe. It is assumed that the corresponding DL/UL configuration is set to UL/DL configuration 6. In the case of UL/DL configuration 6, a transmission position of either a PDSCH connected to ACK/NACK transmitted over a PUCCH or a PDCCH for scheduling the PDSCH is defined as 'n−k', the set (K) of k values (bundling window size) may be represented by the following Table 16 (Downlink association set index K: $\{k_0, k_1, \ldots, k_{M-1}\}$).

TABLE 16

| UL/DL | Subframe n | | | | | | | | | |
|---|---|---|---|---|---|---|---|---|---|---|
| configuration | 0 | 1 | 2 | 3 | 4 | 5 | 6 | 7 | 8 | 9 |
| 6 | | | | 4 | 4 | 4 | | | | z |

I. $\{N_U, N_D\}$=$\{8:0\}$←DL:UL=1:8

The UE may transmit a PUCCH at the subframes (subframe #4, subframe #5) so as to transmit ACK/NACK for the DL subframe. It is assumed that the corresponding DL/UL configuration is set to UL/DL configuration 7. In the case of UL/DL configuration 7, a transmission position of either a PDSCH connected to ACK/NACK transmitted over a PUCCH or a PDCCH for scheduling the PDSCH is defined as 'n−k', the set (K) of k values (bundling window size) may be represented by the following Table 17 (Downlink association set index K: $\{k_0, k_1, \ldots, k_{M-1}\}$).

TABLE 17

| UL/DL | Subframe n | | | | | | | | | |
|---|---|---|---|---|---|---|---|---|---|---|
| configuration | 0 | 1 | 2 | 3 | 4 | 5 | 6 | 7 | 8 | 9 |
| 7 | | | | | 4 | 4 | | | | z |

5 ms DL/UL Switch Point Periodicity

A. $\{X,X,X,X,X,X\}$=$\{D,D,D,D,D,D\}$←DL:UL=8:0

In the proposed frame A, the UL subframe is not present, such that the UE must transmit a PUCCH at the next frame.

B. $\{X,X,X,X,X,X\}$=$\{U,D,D,D,D,D\}$ or $\{D,D,D,U,D,D\}$←DL:UL=7:1

The UE may transmit a PUCCH at the subframe (subframe #2 or subframe #7) so as to transmit ACK/NACK for the DL subframe. It is assumed that the corresponding DL/UL configuration is set to UL/DL configuration 0-a/0-b. In the case of UL/DL configuration 0-a/0-b, a transmission position of either a PDSCH connected to ACK/NACK transmitted over a PUCCH or a PDCCH for scheduling the PDSCH is defined as 'n−k', the set (K) of k values (bundling window size) may be represented by the following Table 18 (Downlink association set index K: $\{k_0, k_1, \ldots, k_{M-1}\}$).

TABLE 18

| UL/DL | Subframe n | | | | | | | | | |
|---|---|---|---|---|---|---|---|---|---|---|
| configuration | 0 | 1 | 2 | 3 | 4 | 5 | 6 | 7 | 8 | 9 |
| 0-a | | | 13, 12, 11, 9, 8, 7, 6, 5, 4 | | | | | | | |

C. $\{X,X,X,X,X,X\}$=$\{U,D,D,U,D,D\}$ or $\{U,U,D,D,D,D\}$ or $\{D,D,D,U,U,D\}$←DL:UL=6:2

The UE may transmit a PUCCH at the subframes (subframe #2, subframe #7) or the other subframes (subframe #7, subframe #8) so as to transmit ACK/NACK for the DL subframe. It is assumed that the corresponding DL/UL configuration is set to UL/DL configuration 1-a/1-b/1-c. In the case of UL/DL configuration 1-a/1-b/1-c, a transmission position of either a PDSCH connected to ACK/NACK transmitted over a PUCCH or a PDCCH for scheduling the PDSCH is defined as 'n−k', the set (K) of k values (bundling window size) may be represented by the following Table 19 (Downlink association set index K: $\{k_0, k_1, \ldots, k_{M-1}\}$).

TABLE 19

| UL/DL configuration | Subframe n | | | | | | | | | |
|---|---|---|---|---|---|---|---|---|---|---|
| | 0 | 1 | 2 | 3 | 4 | 5 | 6 | 7 | 8 | 9 |
| 1-a | | | 8, 7, 6, 4 | | | | | 8, 7, 6, 4 | | |
| 1-b | | | 12, 11, 8, 7 | 7, 6, 5, 4 | | | | | | |
| 1-c | | | | | | | | 12, 11, 8, 7 | 7, 6, 5, 4 | |

D. $\{X,X,X,X,X,X\}$=$\{U,U,D,U,D,D\}$ or $\{U,D,D,U,U,D\}$ or $\{D,D,D,U,U,U\}$ or $\{U,U,U,D,D,D\}$←DL:UL=5:3

The UE may transmit a PUCCH at the subframes (subframe #2, subframe #3, subframe #7), (subframe #2, subframe #7, subframe #8), (subframe #7, subframe #8, subframe #9) or (subframe #2, subframe #3, subframe #4) so as to transmit ACK/NACK for the DL subframe. It is assumed that the corresponding DL/UL configuration is set to UL/DL configuration 2-a/2-b/2-c/2-d. In the case of UL/DL configuration 2-a/2-b/2-c/2-d, a transmission position of either a PDSCH connected to ACK/NACK transmitted over a PUCCH or a PDCCH for scheduling the PDSCH is defined as 'n−k', the set (K) of k values (bundling window size) may be represented by the following Table 20 (Downlink association set index K: $\{k_0, k_1, \ldots, k_{M-1}\}$).

TABLE 20

| UL/DL configuration | Subframe n | | | | | | | | | |
|---|---|---|---|---|---|---|---|---|---|---|
| | 0 | 1 | 2 | 3 | 4 | 5 | 6 | 7 | 8 | 9 |
| 2-a | | | 8, 7, 6 | 5, 4 | | | | 7, 6 | | |
| 2-b | | | 7, 6 | | | | | 8, 7, 6 | 5, 4 | |
| 2-c | | | | | | | | 11, 7, 6 | 6, 5 | 5, 4 |
| 2-d | | | 11, 7, 6 | 6, 5 | 5, 4 | | | | | |

E. {X,X,X,X,X,X}={U,U,D,U,U,D} or {U,U,U,U,D,D} or {U,D,D,U,U,U}←DL:UL=4:4

The UE may transmit a PUCCH at the subframes (subframe #2, subframe #3, subframe #7, subframe #8), (subframe #2, subframe #3, subframe #4, subframe #7), or (subframe #2, subframe #7, subframe #8, subframe #9) so as to transmit ACK/NACK for the DL subframe. It is assumed that the corresponding DL/UL configuration is set to UL/DL configuration 3-a/3-b/3-c. In the case of UL/DL configuration 3-a/3-b/3-c, a transmission position of either a PDSCH connected to ACK/NACK transmitted over a PUCCH or a PDCCH for scheduling the PDSCH is defined as 'n−k', the set (K) of k values (bundling window size) may be represented by the following Table 21 (Downlink association set index K: $\{k_0, k_1, \ldots, k_{M-1}\}$).

TABLE 21

| UL/DL configuration | Subframe n | | | | | | | | | |
|---|---|---|---|---|---|---|---|---|---|---|
| | 0 | 1 | 2 | 3 | 4 | 5 | 6 | 7 | 8 | 9 |
| 3-a | | | 7, 6 | 4 | | | | 7, 6 | 4 | |
| 3-b | | | 7, 6 | 5, 4 | 4 | | | 6 | | |
| 3-c | | | 6 | | | | | 7, 6 | 5, 4 | 4 |

F. {X,X,X,X,X,X}={U,U,U,U,U,D} or {U,U,D,U,U,U}←DL:UL=3:5

The UE may transmit a PUCCH at the subframes (subframe #2, subframe #3, subframe #4, subframe #7, subframe #8) or (subframe #2, subframe #3, subframe #7, subframe #8, subframe #9) so as to transmit ACK/NACK for the DL subframe. It is assumed that the corresponding DL/UL configuration is set to UL/DL configuration 4-a/4-b. In the case of UL/DL configuration 4-a/4-b, a transmission position of either a PDSCH connected to ACK/NACK transmitted over a PUCCH or a PDCCH for scheduling the PDSCH is defined as 'n−k', the set (K) of k values (bundling window size) may be represented by the following Table 22 (Downlink association set index K: $\{k_0, k_1, \ldots, k_{M-1}\}$).

TABLE 22

| UL/DL configuration | Subframe n | | | | | | | | | |
|---|---|---|---|---|---|---|---|---|---|---|
| | 0 | 1 | 2 | 3 | 4 | 5 | 6 | 7 | 8 | 9 |
| 4-a | | | 7 | 7 | 5 | | | 7 | 7 | |
| 4-b | | | 7 | 7 | | | | 7 | 7 | 5 |

G. {X,X,X,X,X,X}={U,U,U,U,U,U}←DL:UL=2:6

The UE may transmit a PUCCH at the subframes (subframe #2, subframe #4, subframe #7, subframe #9) so as to transmit ACK/NACK for the DL subframe. It is assumed that the corresponding DL/UL configuration is set to UL/DL configuration 5. In the case of UL/DL configuration 5, a transmission position of either a PDSCH connected to ACK/NACK transmitted over a PUCCH or a PDCCH for scheduling the PDSCH is defined as 'n−k', the set (K) of k values (bundling window size) may be represented by the following Table 23 (Downlink association set index K: $\{k_0, k_1, \ldots, k_{M-1}\}$).

TABLE 23

| UL/DL configuration | Subframe n | | | | | | | | | |
|---|---|---|---|---|---|---|---|---|---|---|
| | 0 | 1 | 2 | 3 | 4 | 5 | 6 | 7 | 8 | 9 |
| 5 | | | 6 | | 4 | | | 6 | | 4 |

Embodiment 4: HARQ Transmission Timing in Radio Frame Structure Based on User-Specific Dynamic TDD Transmission Scheme Having a Period of at Least One Frame In Embodiment 2, in order to construct the user-specific dynamic TDD, HARQ timing transmission must be defined. The ACK/NACK transmission time (subframe) must be designated in a manner that UL is appropriate for the configuration within one frame. Although Embodiment 4 will disclose ACK/NACK transmission using a PHICH and a PUCCH for convenience of description, it should be noted that ACK/NACK may also be transmitted using other physical channels (e.g., e-PHICH, PDSCH, PUSCH). For convenience of description and better understanding of the present invention, if a transmission period of two frames is configured and many DL subframes are distributed in one frame of Embodiment 1 corresponding to $\{N_U, N_D\}=\{0:8\}$, and if the one frame and the other frame proposed by Embodiment 2 are successively arranged at a specific time, the embodiment 4 will hereinafter be described on the basis of the specific time.

20 ms DL/UL Switch Point Periodicity in Modified User-Common Subcarrier

A. $\{N_U, N_D\}=\{0:8\}$←DL:UL=8:1

The UE may transmit a PUCCH at the subframe #1 so as to transmit ACK/NACK for the DL subframe. It is assumed that the corresponding DL/UL configuration is set to UL/DL configuration 0. In the case of UL/DL configuration 0, a transmission position of either a PDSCH connected to ACK/NACK transmitted over a PUCCH or a PDCCH for scheduling the PDSCH is defined as 'n−k', the set (K) of k values (bundling window size) may be represented by the following Table 24 (Downlink association set index K: $\{k_0, k_1, \ldots, k_{M-1}\}$).

TABLE 24

| UL/DL configuration | Subframe n | | | | | | | | | |
|---|---|---|---|---|---|---|---|---|---|---|
| | 0 | 1 | 2 | 3 | 4 | 5 | 6 | 7 | 8 | 9 |
| 0 | | 23, 22, 21, 19, 18, 17, 16, 15, 14, 13, 12, 11, 10, 9, 8, 7, 6, 5, 4 | | | | | | | | |

B. $\{N_U, N_D\}=\{1:7\}$←DL:UL=7:2

The UE may transmit a PUCCH at the subframes (subframe #1, subframe #2) so as to transmit ACK/NACK for the DL subframe. It is assumed that the corresponding DL/UL configuration is set to UL/DL configuration 1. In the case of UL/DL configuration 1, a transmission position of either a PDSCH connected to ACK/NACK transmitted over a PUCCH or a PDCCH for scheduling the PDSCH is defined as 'n−k', the set (K) of k values (bundling window size) may be represented by the following Table 25 (Downlink association set index K: {$k_0, k_1, \ldots, k_{M-1}$}).

TABLE 25

| UL/DL configu-ration | Subframe n | | | | | | | | | |
|---|---|---|---|---|---|---|---|---|---|---|
| | 0 | 1 | 2 | 3 | 4 | 5 | 6 | 7 | 8 | 9 |
| 1 | | 22, 21, 18, 17, 16, 15, 14, 13, 12 | 12, 11, 10, 9, 8, 7, 6, 5, 4 | | | | | | | |

C. {$N_U, N_D$}={2:6}←DL:UL=6:3

The UE may transmit a PUCCH at the subframes (subframe #1, subframe #2, subframe #3) so as to transmit ACK/NACK for the DL subframe. It is assumed that the corresponding DL/UL configuration is set to UL/DL configuration 2. In the case of UL/DL configuration 2, a transmission position of either a PDSCH connected to ACK/NACK transmitted over a PUCCH or a PDCCH for scheduling the PDSCH is defined as 'n–k', the set (K) of k values (bundling window size) may be represented by the following Table 26 (Downlink association set index K: {$k_0, k_1, \ldots, k_{M-1}$}).

TABLE 26

| UL/DL configu-ration | Subframe n | | | | | | | | | |
|---|---|---|---|---|---|---|---|---|---|---|
| | 0 | 1 | 2 | 3 | 4 | 5 | 6 | 7 | 8 | 9 |
| 2 | | 21, 18, 17, 16, 15, 14, 13 | 13, 12, 11, 10, 9, 8 | 8, 7, 6, 5, 4 | | | | | | |

D. {$N_U, N_D$}={3:5}←DL:UL=5:4

The UE may transmit a PUCCH at the subframes (subframe #1, subframe #2, subframe #3, subframe #4) so as to transmit ACK/NACK for the DL subframe. It is assumed that the corresponding DL/UL configuration is set to UL/DL configuration 3. In the case of UL/DL configuration 3, a transmission position of either a PDSCH connected to ACK/NACK transmitted over a PUCCH or a PDCCH for scheduling the PDSCH is defined as 'n–k', the set (K) of k values (bundling window size) may be represented by the following Table 27 (Downlink association set index K: {$k_0, k_1, \ldots, k_{M-1}$}).

TABLE 27

| UL/DL configu-ration | Subframe n | | | | | | | | | |
|---|---|---|---|---|---|---|---|---|---|---|
| | 0 | 1 | 2 | 3 | 4 | 5 | 6 | 7 | 8 | 9 |
| 3 | | 16, 15, 14, 13 | 13, 12, 11, 10 | 10, 9, 8, 7 | 7, 6, 5, 4 | | | | | |

E. {$N_U, N_D$}={4:4}←DL:UL=4:5

The UE may transmit a PUCCH at the subframes (subframe #1, subframe #2, subframe #3, subframe #4, subframe #5) so as to transmit ACK/NACK for the DL subframe. It is assumed that the corresponding DL/UL configuration is set to UL/DL configuration 4. In the case of UL/DL configuration 4, a transmission position of either a PDSCH connected to ACK/NACK transmitted over a PUCCH or a PDCCH for scheduling the PDSCH is defined as 'n–k', the set (K) of k values (bundling window size) may be represented by the following Table 28 (Downlink association set index K: {$k_0, k_1, \ldots, k_{M-1}$}).

TABLE 28

| UL/DL configu-ration | Subframe n | | | | | | | | | |
|---|---|---|---|---|---|---|---|---|---|---|
| | 0 | 1 | 2 | 3 | 4 | 5 | 6 | 7 | 8 | 9 |
| 4 | | 15, 14, 13 | 13, 12, 11 | 11, 10, 9 | 9, 8, 7 | 7, 6, 5 | | | | |

F. {$N_U, N_D$}={5:3}←DL:UL=3:6

The UE may transmit a PUCCH at the subframes (subframe #1, subframe #2, subframe #3, subframe #4, subframe #5, subframe #6) so as to transmit ACK/NACK for the DL subframe. It is assumed that the corresponding DL/UL configuration is set to UL/DL configuration 5. In the case of UL/DL configuration 5, a transmission position of either a PDSCH connected to ACK/NACK transmitted over a PUCCH or a PDCCH for scheduling the PDSCH is defined as 'n–k', the set (K) of k values (bundling window size) may be represented by the following Table 29 (Downlink association set index K: {$k_0, k_1, \ldots, k_{M-1}$}).

TABLE 29

| UL/DL configu-ration | Subframe n | | | | | | | | | |
|---|---|---|---|---|---|---|---|---|---|---|
| | 0 | 1 | 2 | 3 | 4 | 5 | 6 | 7 | 8 | 9 |
| 5 | | 14, 13, 12 | 12, 11, 10 | 10, 9 | 9, 8 | 8, 7 | 7, 6 | | | |

G. {$N_U, N_D$}={6:2}←DL:UL=2:7

The UE may transmit a PUCCH at the subframes (subframe #1, subframe #2, subframe #3, subframe #4, subframe #5, subframe #6, subframe #7) so as to transmit ACK/NACK for the DL subframe. It is assumed that the corresponding DL/UL configuration is set to UL/DL configuration 6. In the case of UL/DL configuration 6, a transmission position of either a PDSCH connected to ACK/NACK transmitted over a PUCCH or a PDCCH for scheduling the PDSCH is defined as 'n–k', the set (K) of k values (bundling window size) may be represented by the following Table 30 (Downlink association set index K: {$k_0, k_1, \ldots, k_{M-1}$}).

TABLE 30

| UL/DL configu-ration | Subframe n | | | | | | | | | |
|---|---|---|---|---|---|---|---|---|---|---|
| | 0 | 1 | 2 | 3 | 4 | 5 | 6 | 7 | 8 | 9 |
| 6 | | 13, 12 | 12, 11 | 11, 10 | 10, 9 | 9, 8 | 8, 7 | 7 | | |

H. {$N_U, N_D$}={7:1}←DL:UL=1:8

The UE may transmit a PUCCH at the subframes (subframe #1, subframe #2, subframe #3, subframe #4, subframe #5, subframe #6, subframe #7, subframe #8) so as to transmit ACK/NACK for the DL subframe. It is assumed that the corresponding DL/UL configuration is set to UL/DL configuration 7. In the case of UL/DL configuration 7, a transmission position of either a PDSCH connected to ACK/NACK transmitted over a PUCCH or a PDCCH for scheduling the PDSCH is defined as 'n–k', the set (K) of k values (bundling window size) may be represented by the following Table 31 (Downlink association set index K: {k₀, k₁, . . . , k_{M-1}}).

TABLE 31

| UL/DL configu- ration | Subframe n | | | | | | | | |
|---|---|---|---|---|---|---|---|---|---|
| | 0 | 1 | 2 | 3 | 4 | 5 | 6 | 7 | 8 | 9 |
| 7 | | 12, 11 | 11, 10 | 10, 9 | 9, 8 | 8 | 8 | 8 | 8 |

I. $\{N_U, N_D\} = \{8:0\} \leftarrow DL:UL = 0:9$

The UE may transmit a PUCCH at the subframes (subframe #1, subframe #2, subframe #3, subframe #4, subframe #5, subframe #6, subframe #7, subframe #8, subframe #9) so as to transmit ACK/NACK for the DL subframe. It is assumed that the corresponding DL/UL configuration is set to UL/DL configuration 8. In the case of UL/DL configuration 8, a transmission position of either a PDSCH connected to ACK/NACK transmitted over a PUCCH or a PDCCH for scheduling the PDSCH is defined as 'n−k', the set (K) of k values (bundling window size) may be represented by the following Table 32 (Downlink association set index K: {k₀, k₁, . . . , k_{M-1}}).

TABLE 32

| UL/DL configu- ration | Subframe n | | | | | | | | |
|---|---|---|---|---|---|---|---|---|---|
| | 0 | 1 | 2 | 3 | 4 | 5 | 6 | 7 | 8 | 9 |
| 8 | | 11, 10 | 10, 9 | 9 | 9 | 9 | 9 | 9 | 9 | 9 |

In addition, it is obvious to those skilled in the art that various UL-DL configurations decided according to the UL/DL ratio (i.e., the ratio of UL subframes to DL subframes) are combined and configured as a single table. Information about the single table may be shared in advance between the BS and the UE, or the BS may inform the UE of the information about the single table through higher layer signaling (e.g., RRC signaling). When using the above table, the UE may implicitly acquire DL/UL switch point periodicity information without directly receiving the DL/UL switch point periodicity information from the BS.

In addition, UL/DL configuration information shown in Tables 10 to 32 may be shared in advance between the BS and the UE, or the BS may inform the UE of the UL/DL configuration information through higher layer signaling (e.g., RRC signaling).

The above-described embodiments correspond to combinations of elements and features of the present invention in prescribed forms. And, the respective elements or features may be considered as selective unless they are explicitly mentioned. Each of the elements or features can be implemented in a form failing to be combined with other elements or features. Moreover, it is able to implement an embodiment of the present invention by combining elements and/or features together in part. A sequence of operations explained for each embodiment of the present invention can be modified. Some configurations or features of one embodiment can be included in another embodiment or can be substituted for corresponding configurations or features of another embodiment. And, it is apparently understandable that an embodiment is configured by combining claims failing to have relation of explicit citation in the appended claims together or can be included as new claims by amendment after filing an application.

Those skilled in the art will appreciate that the present invention may be carried out in other specific ways than those set forth herein without departing from the spirit and essential characteristics of the present invention. The above embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein.

INDUSTRIAL APPLICABILITY

The method for transmitting HARQ (Hybrid Automatic Repeat reQuest) ACK/NACK feedback using a UE-specific TDD frame by a user equipment (UE) in a wireless communication system is industrially applicable to various wireless communication systems such as a 3GPP LTE/LTE-A system and a 5G communication system.

The invention claimed is:
1. A method for transmitting a hybrid automatic repeat request (HARQ) acknowledge (ACK)/non-acknowledge (NACK) using a time division duplex (TDD) scheme by a user equipment (UE) in a wireless communication system, the method comprising:
  receiving a downlink (DL) channel in a DL subframe n−k of a first UE-specific TDD frame, wherein a beginning subframe of the first UE-specific TDD frame is configured for downlink, and a next beginning subframe of the first UE-specific TDD frame is configured as a TDD special subframe, and each of remaining subframes of the first UE-specific TDD frame is configured for downlink, wherein the DL subframe n−k is one of subframes of the first UE-specific TDD frame; and
  transmitting the HARQ ACK/NACK for the DL channel in a uplink (UL) subframe n of a second UE-specific TDD frame, wherein the UL subframe n of the second UE-specific TDD frame is located after at least four subframes from the DL subframe n−k and the DL subframe n−k is located before k subframes than the UL frame n, wherein a beginning subframe of the second UE-specific TDD frame is configured as a TDD special subframe, and a next beginning subframe of the second UE-specific TDD frame is configured for uplink, and remaining subframes of the second UE-specific TDD frame include at least one UL subframe and/or at least one DL subframe, wherein the UL subframe n is one of among the next beginning subframe of the second UE-specific TDD frame and the at least one UL subframe,
  wherein the first UE-specific TDD frame and the second UE-specific TDD frame are successive, and
  wherein a relation between the DL subframe n−k and the UL subframe n satisfies one of following tables which define k:

| UL/DL configuration | Subframe n | | | | | | | | | |
|---|---|---|---|---|---|---|---|---|---|---|
| | 0 | 1 | 2 | 3 | 4 | 5 | 6 | 7 | 8 | 9 |
| 0 | | 23,22,21,19,18,17,16,15, 14,13,12,11,10,9,8,7,6,5,4 | | | | | | | | |

| UL/DL configuration | Subframe n | | | | | | | | | |
|---|---|---|---|---|---|---|---|---|---|---|
| | 0 | 1 | | 2 | | 3 | 4 5 | 6 7 | 8 9 | |
| 1 | | 22,21,18,17,16, 15,14,13,12 | | 12,11,10,9, 8,7,6,5,4 | | | | | | |

| UL/DL configuration | Subframe n | | | | | | | | | |
|---|---|---|---|---|---|---|---|---|---|---|
| | 0 | 1 | | 2 | | 3 | 4 5 | 6 7 8 9 | | |
| 2 | | 21,18,17,16, 15,14,13 | | 13,12,11, 10,9,8 | | 8,7,6, 5,4 | | | | | and

| UL/DL configuration | Subframe n | | | | | | | |
|---|---|---|---|---|---|---|---|---|
| | 0 | 1 | 2 | 3 | 4 | 5 | 6 | 7 8 9 |
| 3 | | 16,15, 14,13 | 13,12, 11,10, | 10,9, 8,7 | 7,6, 5,4 | | | |

2. The method according to claim 1, wherein the beginning subframe of the first UE-specific TDD frame and the next beginning subframe of the first UE-specific TDD frame are configured as first UE-common subframes.

3. The method according to claim 2, wherein the first UE-common subframes correspond to subframes that are commonly configured, based on configurations for the first UE-specific TDD frame, in UEs of the wireless communication system or UEs of a cell including the UEs.

4. The method according to claim 1, wherein the beginning subframe of the second UE-specific TDD frame and the next beginning subframe of the second UE-specific TDD frame are configured as second UE-common subframes.

5. The method according to claim 4, wherein the second UE-common subframes correspond to subframes that are commonly configured, based on configurations for the second UE-specific TDD frame, in UEs of the wireless communication system or UEs of a cell including the UEs.

6. The method according to claim 1, wherein the UL subframe n is determined as one of among the next beginning subframe of the second UE-specific TDD frame and the at least one UL subframe, based on bundling window sizes corresponding respectively to the next beginning subframe of the second UE-specific TDD frame and the at least one UL subframe, and
wherein bundling window sizes are distributed uniformly in the next beginning subframe of the second UE-specific TDD frame and the at least one UL subframe.

7. A user equipment (UE) for transmitting a hybrid automatic repeat request (HARQ) acknowledge (ACK)/non-acknowledge (NACK) using a time division duplex (TDD) scheme in a wireless communication system, the UE comprising:
a transceiver coupled to a processor; and
the processor configured to:
receive a downlink (DL) channel in a DL subframe n−k of a first UE-specific TDD frame, wherein a beginning subframe of the first UE-specific TDD frame is configured for downlink, and a next beginning subframe of the first UE-specific TDD frame is configured as a TDD special subframe, and each of remaining subframes of the first UE-specific TDD frame is configured for downlink, wherein the DL subframe n−k is one of subframes of the first UE-specific TDD frame, and
transmit the HARQ ACK/NACK for the DL channel in a uplink (UL) subframe of a second UE-specific TDD frame wherein the UL subframe n of the second UE-specific TDD frame is located after at least four subframes from the DL subframe n−k and the DL subframe n−k is located before k subframes than the UL frame n, wherein a beginning subframe of the second UE-specific TDD frame is configured as a TDD special subframe, and a next beginning subframe of the second UE-specific TDD frame is configured for uplink, and remaining subframes of the second UE-specific TDD frame include at least one UL subframe and/or at least one DL subframe, wherein the UL subframe n is one of among the next beginning subframe of the second UE-specific TDD frame and the at least one UL subframe,
wherein the first UE-specific TDD frame and the second UE-specific TDD frame are successive, and
wherein a relation between the DL subframe n−k and the UL subframe n satisfies one of following tables which define k:

| UL/DL configuration | Subframe n | | | | | | | | |
|---|---|---|---|---|---|---|---|---|---|
| | 0 | 1 | | | 2 3 | 4 5 | 6 7 8 9 | | |
| 0 | | 23,22,21,19,18,17,16,15,14, 13,12,11,10,9,8,7,6,5,4 | | | | | | | |

| UL/DL configuration | Subframe n | | | | | | | | |
|---|---|---|---|---|---|---|---|---|---|
| | 0 | 1 | | 2 | | 3 | 4 5 | 6 7 | 8 9 |
| 1 | | 22,21,18,17,16, 15,14,13,12 | | 12,11,10,9, 8,7,6,5,4 | | | | | |

| UL/DL configuration | Subframe n | | | | | | |
|---|---|---|---|---|---|---|---|
| | 0 | 1 | | 2 | 3 | 4 5 | 6 7 8 9 |
| 0 | | 21,18,17,16, 15,14,13 | | 13,12,11, 10,9,8 | 8,7,6, 5,4 | | | and

| UL/DL configuration | Subframe n | | | | | | |
|---|---|---|---|---|---|---|---|
| | 0 | 1 | 2 | 3 | 4 | | 5 6 7 8 9 |
| 3 | | 16,15,14,13 | 13,12,11,10 | 10,9,8,7 | 7,6,5,4 | | |

8. The UE according to claim 7, wherein the beginning subframe of the first UE-specific TDD frame and the next beginning subframe of the first UE-specific TDD frame are configured as a first UE-common subframes.

9. The UE according to claim 8, wherein the first UE-common subframes correspond to subframes that are commonly configured, based on configurations for the first UE-specific TDD frame, in UEs of the wireless communication system or UEs of a cell including the UEs.

10. The UE according to claim 7, wherein the beginning subframe of the second UE-specific TDD frame and the next beginning subframe of the second UE-specific TDD frame are configured as second UE-common subframes.

11. The UE according to claim 10, wherein the second UE-common subframes correspond to subframes that are commonly configured, based on configurations for the second UE-specific TDD frame, in UEs of the wireless communication system or UEs of a cell including the UEs.

12. The UE according to claim 7,
  wherein the UL subframe n is determined as one of among the next beginning subframe of the second UE-specific TDD frame and the at least one UL subframe, based on bundling window sizes corresponding respectively to the next beginning subframe of the second UE-specific TDD frame and the at least one UL subframe, and
  wherein bundling window sizes are distributed uniformly in the next beginning subframe of the second UE-specific TDD frame and the at least one UL subframe.

\* \* \* \* \*